(12) United States Patent
Buchmann

(10) Patent No.: US 12,079,623 B2
(45) Date of Patent: *Sep. 3, 2024

(54) CONSOLIDATION SPACES PROVIDING ACCESS TO MULTIPLE INSTANCES OF APPLICATION CONTENT

(71) Applicant: SAP SE, Walldorf (DE)

(72) Inventor: Daniel Buchmann, Karlsruhe (DE)

(73) Assignee: SAP SE, Walldorf (DE)

( * ) Notice: Subject to any disclaimer, the term of this patent is extended or adjusted under 35 U.S.C. 154(b) by 149 days.

This patent is subject to a terminal disclaimer.

(21) Appl. No.: 17/834,813

(22) Filed: Jun. 7, 2022

(65) Prior Publication Data

US 2023/0393845 A1  Dec. 7, 2023

(51) Int. Cl.
*G06F 8/71* (2018.01)

(52) U.S. Cl.
CPC ........................ *G06F 8/71* (2013.01)

(58) Field of Classification Search
None
See application file for complete search history.

(56) References Cited

U.S. PATENT DOCUMENTS

| | | | | |
|---|---|---|---|---|
| 9,632,837 | B2 * | 4/2017 | Urdang | G06F 9/5061 |
| 10,356,214 | B2 * | 7/2019 | Joshi | G06F 9/45558 |
| 11,768,678 | B2 * | 9/2023 | Trim | G06F 8/71 |
| | | | | 717/121 |
| 11,941,151 | B2 | 3/2024 | Mendoza et al. | |
| 2005/0102683 | A1 * | 5/2005 | Branson | G06F 9/541 |
| | | | | 719/328 |
| 2016/0139916 | A1 * | 5/2016 | Pillay | G06F 8/60 |
| | | | | 717/122 |
| 2021/0089512 | A1 | 3/2021 | Fuchs | |
| 2021/0089520 | A1 | 3/2021 | Oberhofer et al. | |
| 2022/0035823 | A1 | 2/2022 | Morton et al. | |
| 2022/0147952 | A1 * | 5/2022 | Michael | G06Q 10/0875 |
| 2022/0335156 | A1 | 10/2022 | Raphael et al. | |
| 2023/0281006 | A1 * | 9/2023 | Maidens | G06F 9/44505 |
| | | | | 717/170 |
| 2023/0393845 | A1 * | 12/2023 | Buchmann | G06F 16/25 |
| 2023/0418680 | A1 * | 12/2023 | Buchmann | G06F 9/44505 |

(Continued)

OTHER PUBLICATIONS

Ashraf, "Using Ant Colony System to Consolidate Multiple Web Applications in a Cloud Environment", 2014, IEEE (Year: 2014).*

(Continued)

*Primary Examiner* — Hossain M Morshed
(74) *Attorney, Agent, or Firm* — Klarquist Sparkman, LLP

(57) ABSTRACT

Techniques and solutions are provided for grouping of applications, including application content, or other content useable by a computer-implemented process. In particular, a consolidation space is provided as a lightweight mechanism for this purpose. Identifiers are received for multiple landscape elements, where a landscape element can be an application, application content, or other content. A given landscape element has a type and has one or more artifacts. A consolidation space is generated for at least first and second landscape elements having a first type. A consolidation artifact is generated in the consolidation space, where the consolidation artifact references respective first and second instances of a first artifact in the first and second landscape elements.

20 Claims, 25 Drawing Sheets

(56) References Cited

U.S. PATENT DOCUMENTS

2023/0418803 A1* 12/2023 Buchmann .......... H04L 67/1014
2023/0418808 A1* 12/2023 Buchmann ................ G06F 8/71

OTHER PUBLICATIONS

Kourai, "Seamless and Secure Application Consolidation for Optimizing Instance Deployment in Clouds", 2016, IEEE (Year: 2016).*
Non-Final Office Action issued in U.S. Appl. No. 17/846,331, filed Apr. 4, 2024, 16 pages.
Non-Final Office Action issued in U.S. Appl. No. 17/846,347, filed Feb. 15, 2024, 15 pages.

* cited by examiner

| PackageID | InstanceID | GroupID1 | GroupID2 | ... | GroupIDn |
|---|---|---|---|---|---|
| Pkg1 | 1 | 1 | 5 | ... | |
| Pkg1 | 2 | 2 | | ... | |
| Pkg2 | 1 | 6 | | ... | |

FIG. 13

```
{
  {
    "definitions": { "ABC": {                                                    1800
      "kind": "entity",
      "@ObjectModel.modelingPattern": { "#", "ANALYTICAL_DIMENSION" }, "query": {
        "SET": {
          "op": "unionAll", "args": [
     1820    "SELECT": {
              "from": {
                "ref": [
                              "S4/EU.ABC"
                            ]
                },
                "columns": [
                  {
                    "ref": [
                              "X"
                            ]
     1830      },
                  {
                    "ref": [
                              "Y"
                            ]
                  },
                  {
                    "ref": [
                              "Z"
                            ]
                  },
                  {                      1832
                    "val": "S4/EU",
                    "as": "/S4_1/multiInst_spaceColumn"
                  }
                ]
              },
              "SELECT": {
                "from": {
                  "ref": [
                              "S4/AM.ABC"
                            ]
                  },
                  "columns": [
                    {
                      "ref": [
                              "X"
                            ]
     1840        },
                    {
                      "ref": [
                              "Y"
                            ]
                    },
                    {
                      "ref": [
                              "Z"
                            ]
                    },
                    {                    1842
                      "val": "S4/AM",
                      "as": "/S4_1/multiInst_spaceColumn"
                    }
                  ]
                }
              ]
            }
1810      },
          "elements": { "X": { ... },
          "Y": { ... },              1812
          "Z": { ... },
          "/S4_1/multiInst_spaceColumn": { "@DataWarehouse.multiTenant.providerIdentification": true,
                    "type": "cds.String"
                  }
          }
        }
      1814
    }
  }
}
```

FIG. 18

```
@Scope: [#VIEW, #ENTITY]
annotation DataWarehouse {
    ...
    multiTentant: {                                    ⟵1910
        @Scope: [#ELEMENT]
        providerIdentification: boolean default true, @Scope: [#ENTITY]
        dataTopology: String(30) enum { UNDEFINED; DISJUNCTIVE; HARMONIZED_KEYS; REPRESENTATIVE_PROVIDER;
HARMONIZED_DATA };                  ⟵1920
        @Scope: [#ELEMENT]
        representativeProvider: String;
    };
    ...
};
```

```
{
    "definitions": { "ABC": {
        "kind": "entity",
        "@ObjectModel.modelingPattern": { "#", "ANALYTICAL_DIMENSION" }, "@....": "....",
        "query": { .... },
        "elements": { .... }
    }
},{
    "extensions": [
        {
            annotate "ABC" with
            "@DataWarehouse.multitentant.dataTopology": { "#", "DISJUNCTIVE" }
        }
    ]
}
```

FIG. 20

```
{
    "definitions": { "ABC": {
        "kind": "entity",
        "@ObjectModel.modelingPattern": { "#", "ANALYTICAL_DIMENSION" }, "@....": "....",
        "query": { .... },
        "elements": { .... }
    }
    },
    "extensions": [
        {
            annotate "ABC",
            "@DataWarehouse.multiTentant: {
                "dataTopology": { "#", "REPRESENTATIVE_PROVIDER" },
                "representativeProvider": { "=", "S4/EU" }
            }
        }
    ]
}
```

CONSOLIDATION SPACES PROVIDING ACCESS TO MULTIPLE INSTANCES OF APPLICATION CONTENT

FIELD

The present disclosure generally relates to managing landscapes comprising a plurality of landscape elements, such as software applications or content useable therewith. Particular embodiments relate to grouping or consolidating landscape elements.

BACKGROUND

Software use scenarios are increasingly complex. For example, rather than running a single instance of a software application, a business that uses the software may run several instances of the software application. Take a business that operates in both the United States and the European Union. For various reasons (such as differing legal constraints), rather than running a single software instance to handle data for both regions, the business may have one instance of the software available to handle data or operations for the United States and another instance of the software available to handle data or operations for the European Union.

Another way that software use scenarios are becoming more complex is that it is increasingly common for users to wish to combine data from multiple software applications. A company may, for instance, have one software application that is used to manage employee information and another software application that is used to manage financial operations. For a variety of reasons, users may wish to leverage data in both of these applications concurrently.

When multiple software applications are available to a user, there can also be situations where application functionality or data can differ depending on what other software applications are available to the user. That is, software functionality for an application A may be limited if it can only be assumed that application A is available. However, it could be that application A could be provided with additional functionality if application B were also available. For a variety of reasons, it may not be desirable to include such "cross-application content," or simply "cross-content," in application A, including because it can increase the size and complexity of application A for users who do not have application B available.

Implementing software use scenarios that involve multiple software applications, or multiple instances of a single software application, can be complex. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for grouping of applications, including application content, or other content useable by a computer-implemented process. In particular, a consolidation space is provided as a lightweight mechanism for this purpose. Identifiers are received for multiple landscape elements, where a landscape element can be an application, application content, or other content. A given landscape element has a type and has one or more artifacts. A consolidation space is generated for at least first and second landscape elements having a first type. A consolidation artifact is generated in the consolidation space, where the consolidation artifact references respective first and second instances of a first artifact in the first and second landscape elements.

In one aspect, the present disclosure provides techniques for creating consolidation spaces, where the consolidation spaces are used to provide consolidated access to data associated with multiple instances of a software application or software content. Identifiers are received for a plurality of landscape elements, such as instances of a software application or software content. A given landscape element of the plurality of landscape elements include one or more artifacts, such as tables or views, and has a type (for example, the type can identify a particular application or a particular set of software content). A consolidation space is generated for at least a first landscape element of the plurality of landscape elements having a first type and at least a second landscape element of the plurality of landscape elements having the first type. A first consolidation artifact is generated in the consolidation space. The first consolidation artifact references a first instance of a first artifact in the at least a first landscape element and a second instance of the first artifact in the at least a second landscape element.

The present disclosure also includes computing systems and tangible, non-transitory computer readable storage media configured to carry out, or including instructions for carrying out, an above-described method (or operations). As described herein, a variety of other features and advantages can be incorporated into the technologies as desired.

BRIEF DESCRIPTION OF THE DRAWINGS

FIG. 13 illustrates how grouping information can be maintained in an artifact definition or a table or other data structure or datatype.

FIG. 18 provides an example definition of a consolidation artifact.

FIG. 19 illustrates example code for an annotation that adds integration configuration information to an artifact.

FIGS. 20 and 21 provide example code for data artifacts that include data integration configuration information.

DETAILED DESCRIPTION

Example 1—Overview

Figure 1:
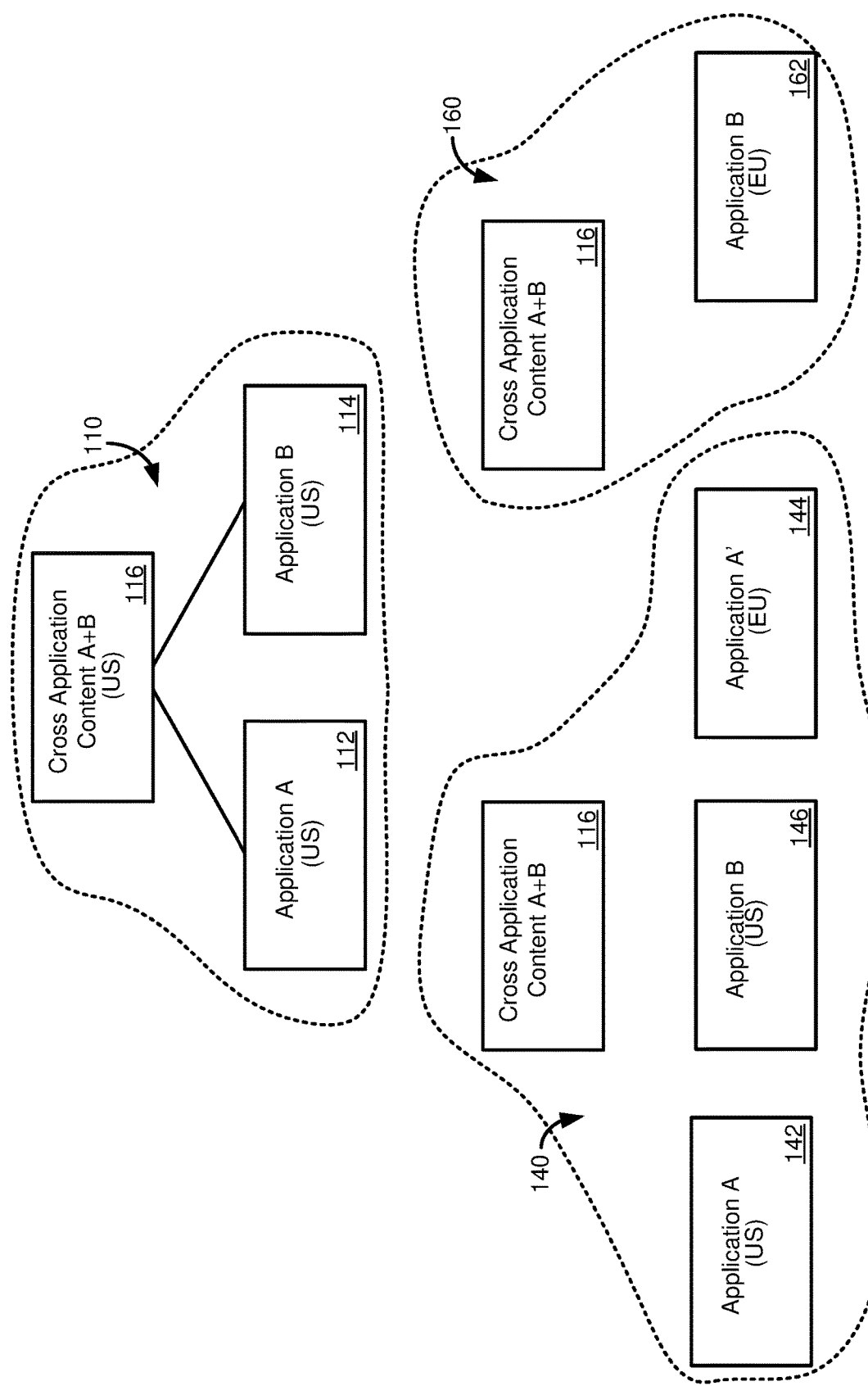
FIGS. 1 and 2 are block diagrams illustrating how application or content can be grouped, including for the purposes of providing cross-content.

Software use scenarios are increasingly complex. For example, rather than running a single instance of a software application, a business that uses the software may run several instances of the software application. Take a business that operates in both the United States and the European Union. For various reasons (such as differing legal constraints), rather than running a single software instance to handle data for both regions, the business may have one instance of the software available to handle data or operations for the United States and another instance of the software available to handle data or operations for the European Union.

Another way that software use scenarios are becoming more complex is that it is increasingly common for users to wish to combine data from multiple software applications. A company may, for instance, have one software application that is used to manage employee information and another software application that is used to manage financial operations. For a variety of reasons, users may wish to leverage data in both of these applications concurrently.

When multiple software applications are available to a user, there can also be situations where application functionality or data can differ depending on what other software applications are available to the user. That is, software functionality for an application A may be limited if it can only be assumed that application A is available. However, it could be that application A could be provided with additional functionality if application B were also available.

Cross-content may be developed for a scenario where an application A and an application B are both available. The cross-content can be functionality, such as processes, user interface elements, or software elements (for example, data types, including instances of abstract or composite data types, data structures, or data models, where in some cases a data model can be a collection of software objects, such as instances of abstract data types), for one or more of the software applications for which the cross-content is defined. That is, if cross-content is defined for the combination of application A and application B, the cross-content can be content for application A, content for application B, or content for applications A and B.

For a variety of reasons, it may not be desirable to include such "cross-application content," or simply "cross-content," in application A. For example, including cross-content of application B in application A can increase the size and complexity of application A for users who do not have application B available. Additional reasons why it may not be desirable to incorporate cross-content in a single, component application include because the cross-content may have a different lifecycle than the base application, and because different organizations/groups may be responsible for such cross-content. That is, the developers of an application A may not be familiar with application B, such that it would be appropriate for them to incorporate application B cross-content into application A. Package complexity can also be increased if various types of content have to be packaged such that isolated parts of a package can be installed if a particular installation environment does not meet requirements for installing an entire package.

Having cross-content in an installation package that is separate from the applications for which the cross-content is defined can help address this issue. In addition, having the cross-content in a separate installation package can help restrict access to the cross-content. The cross-content can represent a significant development effort, and can provide valuable features. Having the cross-content in a separate installation package provides a way of restricting access to the cross-content, such as to businesses who find the cross-content to be of sufficient value to separately acquire the cross-content. Note that the present application contains uses of "cross-application content" for simplicity of presentation. However, unless indicated otherwise, the discussion of cross-application content applies with equal force to other types of "cross-content."

Implementing software use scenarios that involve multiple software applications, or multiple instances of a single software application, can be complex. Accordingly, room for improvement exists.

As an example of how software scenarios involving multiple software applications or software application instances can be complex, consider that installation scenarios often assume a particular state at a computing system. Even for an installation of a single software application, the installation typically assumes the presence of suitable system resources (processor, memory), a suitable operating system, and optionally other software, such as software libraries or supporting programs or frameworks.

In the case of situations where a particular user may have multiple instances of the same software application, or where an application or content may be available if a set of applications are available, it can be very difficult to anticipate what landscapes may be in use, or how applications and content in a landscape should be treated. As used herein, a "landscape" refers to a set of applications or content available in a particular computing environment. A landscape can include multiple instances of an application or content, or can include different applications or content.

As an example of how varying landscapes can be difficult to account for, consider software or content that is developed that is installable if both application A and application B are available on a target system. If application B does not exist on a particular landscape, or if two instances of application A are present in the landscape, it may not be possible for the software or content to be installed. As another example, consider two landscapes where two instances of application A and two instances of application B are available. It may be possible to group data of the application instances, but the groupings could be done in different ways. One grouping may be to group both instances of application A and to group both instances of application B. Another grouping may be to form two groups, each having an instance of application A and application B. In addition to difficulties in accounting for all of the different landscapes that might be possible, it may not be clear which of multiple ways of handling a landscape should be selected for a particular situation.

The present disclosure provides a variety of innovations that can help address these issues. One innovation provides a grouping technology that allows applications and content to be grouped in a landscape, including landscapes having multiple instances of an application or content. Grouping can allow for a landscape to be organized such that software installations and other actions can be performed without developers having to be as concerned about different landscape configurations, as the manager of a given landscape can define appropriate groupings. Groupings provide an important feature, in that by defining a group as including certain applications or content, other applications or content are by definition excluded from a group that does not include them. In at least some cases, applications or content need not be included in any group, or they can be included in a group but where they are the only member of the group. In further cases, applications or content can be included in multiple groups, including within nested groups.

Another innovation provides for a consolidation space that can be used to implement grouping of applications or content. The consolidation space can be used with the grouping techniques of the present disclosure or in other situations where applications/content are to be grouped. A consolidation space can be a lightweight mechanism of combining data associated with software applications or content. The consolidation space receives queries and directs the query to one or more targets that are consolidated by the application. In a particular example, definitions of artifacts are created in the consolidation space that are union views on artifacts in the targets consolidated using the consolidated space. So, a query can obtain consolidated data through a consolidation artifact in a consolidation space (or, more generally, a consolidation element). Or, as explained below, an identifier of a particular target or targets (such as a consolidation element) can be provided as filter criteria and used to limit retrieved data.

In some cases, those using applications or content may only wish to interact with consolidated data, regardless of whether the consolidated data is obtained by the grouping techniques of the present disclosure or consolidated using the disclosed consolidation spaces. However, in at least some situations, it may be useful to maintain an identifier of where consolidated data originated from. That is, for example, if consolidated data originates from applications A, B, and C, it may be useful to both provide the ability to interact with the data from applications A, B, and C as consolidated data, but to also provide the ability to identify data originating from specific applications. Similarly, if consolidated data is associated with two instances of application A, it may be useful to allow a user to selectively obtain data associated with a particular instance of application A. In some cases, identifiers of individual targets contributing to consolidated data can be provided in a user interface, such as filter criteria for use with the consolidated data.

Consolidating data can include consolidating multiple instances of a common data artifact, such as an artifact in a virtual or physical data model. Consolidating data can also include consolidating data actually stored in association with such artifacts. In one aspect, the present disclosure provides techniques for indicating how multiple instances of an artifact, which can optionally be different versions of an artifact (for example, where one version contains fields or attributes that are not in another version of the artifact) relate to one another, such as how the keys of one instance of an artifact relate to those of another instance, or from which artifact data should be retrieved when multiple instances of the artifact have qualifying data.

Example 2—Example Computing Environment

FIGS. 1-12 illustrate examples of how applications and content can be grouped, such as to consolidate data or to control a landscape definition. Landscape definitions can be used to assist or direct how applications or content are deployed, or whether they are deployed. FIG. 1 illustrates scenarios 110, 140, 160 that involve one or more instances of a first application, application A, an instance of a second application, application B, and cross-application content that can be installed if both application A and application B are available.

Scenario 110 involves a single instance 112 of application A and single instance 114 of application B. Cross-application content 116 is defined for installation when a single instance of application A and application B are available. Thus, scenario 110 can represent a straightforward scenario where an installation landscape matches the expected deployment landscape for the cross-application content 116.

Scenarios 140 and 160 do not comply with the expected deployment scenario for the cross-application content 116. Scenario 140 has a single instance 146 of application B, but has multiple instances 142, 144 of application A. The instances 142, 144 can represent, for example, an instance of the software application used for European operations and an instance of the software application used for operations in North America. As the cross-application content 116 is defined for a single instance of application A, it may not be clear (to an installation program or to an administrator responsible for installing the cross-application content) whether the cross-application content should be installed for the combination of instance 142 of application A and the single instance 146 of application B, the combination of instance 144 of application A and the single instance 146 of application B, or whether the instances 142, 144 of application A should be combined, and that combination combined with the single instance 146 of application B.

It could be that combining the two instances 142, 144 of application A, and then installing the cross-application content 116 for that combination and the single instance 146 of application B is the most "logical." However, even in this scenario, issues can arise. First, it could be that even though the two instances 142, 144 of application A could be combined, that a user of the landscape of the scenario 140 does not wish to have the cross-application content 116 installed for both instances 142, 144 of application A. The user of the landscape may have reasons for not wanting the data of application A combined, such as for performance reasons or to maintain data separation. Or, it could be that the cross-application content 116 is associated with a license fee, and the user of the landscape does not find the cross-application content to have sufficient value to acquire the license for both instances 142, 144 of application A.

Note that cross-application content can be associated with a cross-application space. Unless specified otherwise, it should be assumed that cross-application content can be associated with a cross-application space. Cross-application spaces can be considered for use in grouping, consolidation, or other techniques described in the present disclosure. That is, in some cases, consolidation can occur using the consolidation spaces described in Example 4. In other cases, consolidation can occur using a different mechanism.

Scenario 160 illustrates a scenario where the cross-application content 116 expects a landscape with both application A and application B, but the scenario only includes an instance 162 of application B and no instance of application A.

Figure 2:
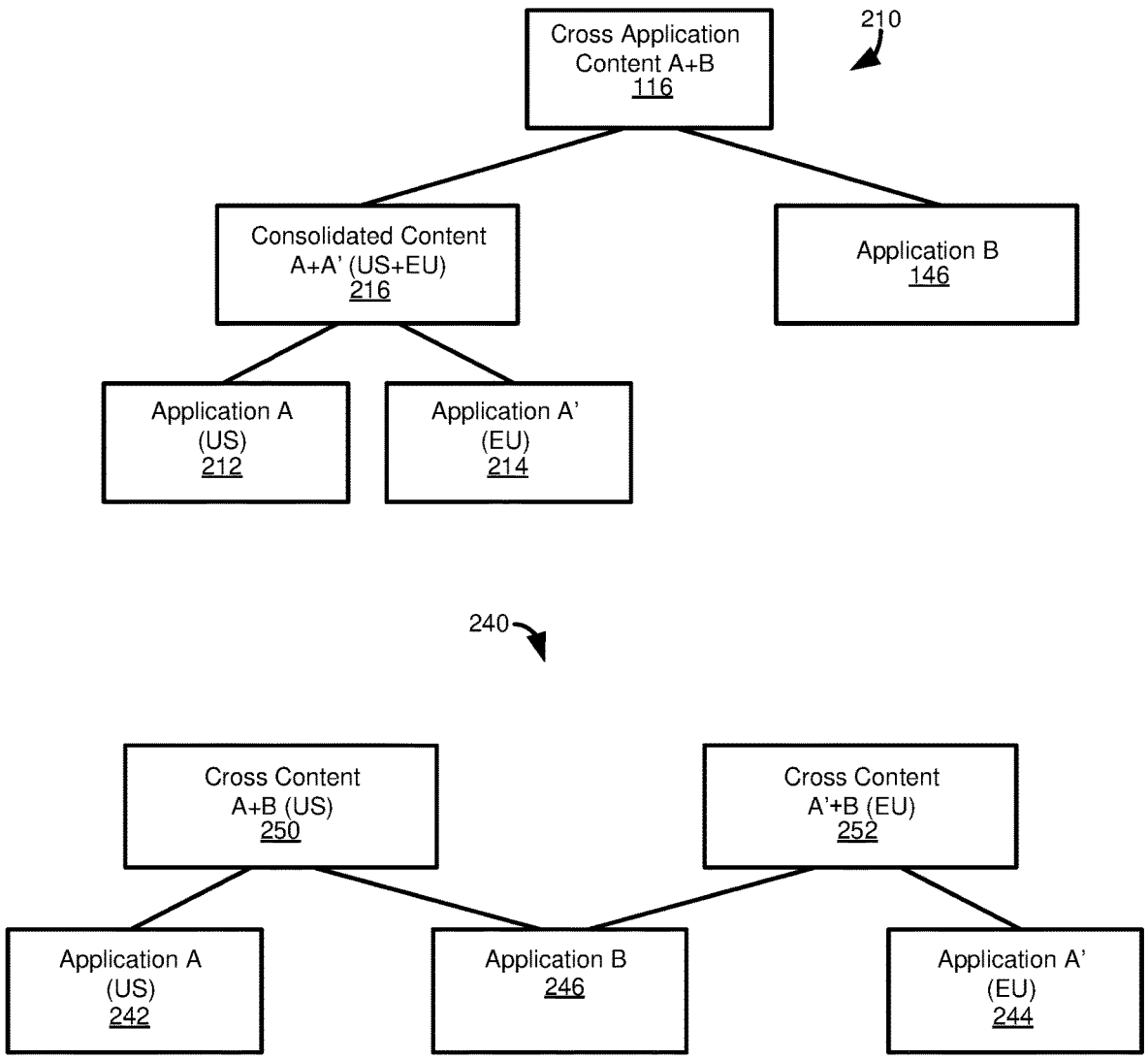

FIG. 2 illustrates two ways in which the application instances 142, 144, 146 and the cross-application content 116 can be organized using grouping. In a scenario 210, two instances 212, 214 of application A (representing, in this case, data for the United States and data for the European Union) are combined to provide consolidated application A content 216. The cross-application content 116 is then installed referencing the consolidated application A content 216 and the single instance 146 of application B. The scenario 210 results in pooled data for the two instances 142, 144 of application A.

In a scenario 240, a single instance 246 of application B is present, but is defined as being part of two groups. One group combines the instance 246 of application B with a first instance 242 of application A. Another group combines the instance 246 of application B with a second instance 244 of application A. In this case, two instances 250, 252 of the cross-content are installed, one for the group with the first instance 242 of application A and one for the group with the second instance 244 of application A. The scenario 240 can be beneficial in situations where, for instance, it is desired to separate the cross-content for data associated with the United States (instance 242) from cross-content associated with the European Union (instance 244). Scenario 240 illustrates that, at least in some scenarios, particular applications or content can be defined as being in multiple groups.

Figure 3A:
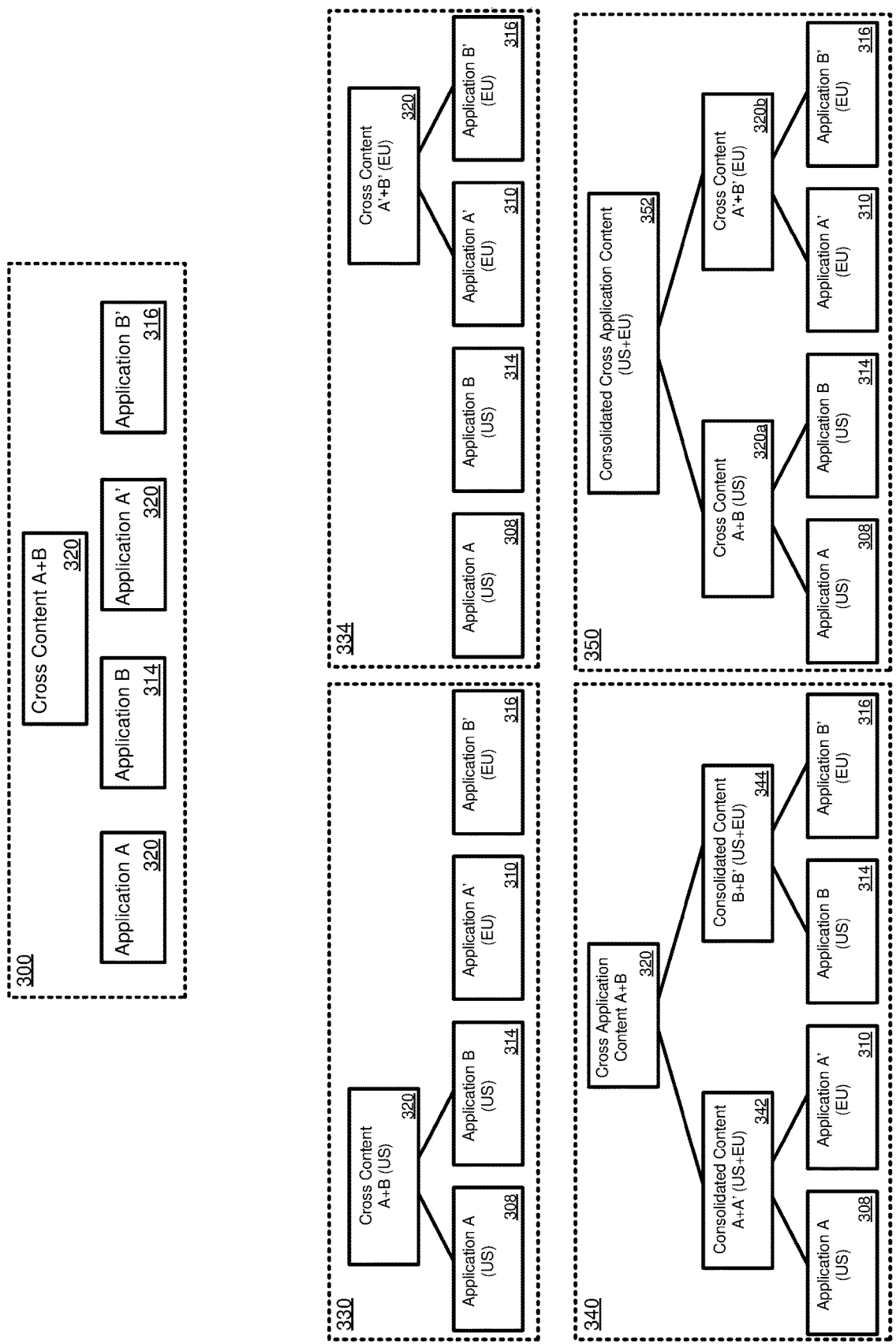
FIGS. 3A and 3B are block diagrams illustrating how grouping can become more complex, and potentially ambiguous, as a landscape includes more landscape elements, such as additional applications or additional content, or additional instances thereof.
Figure 3B:
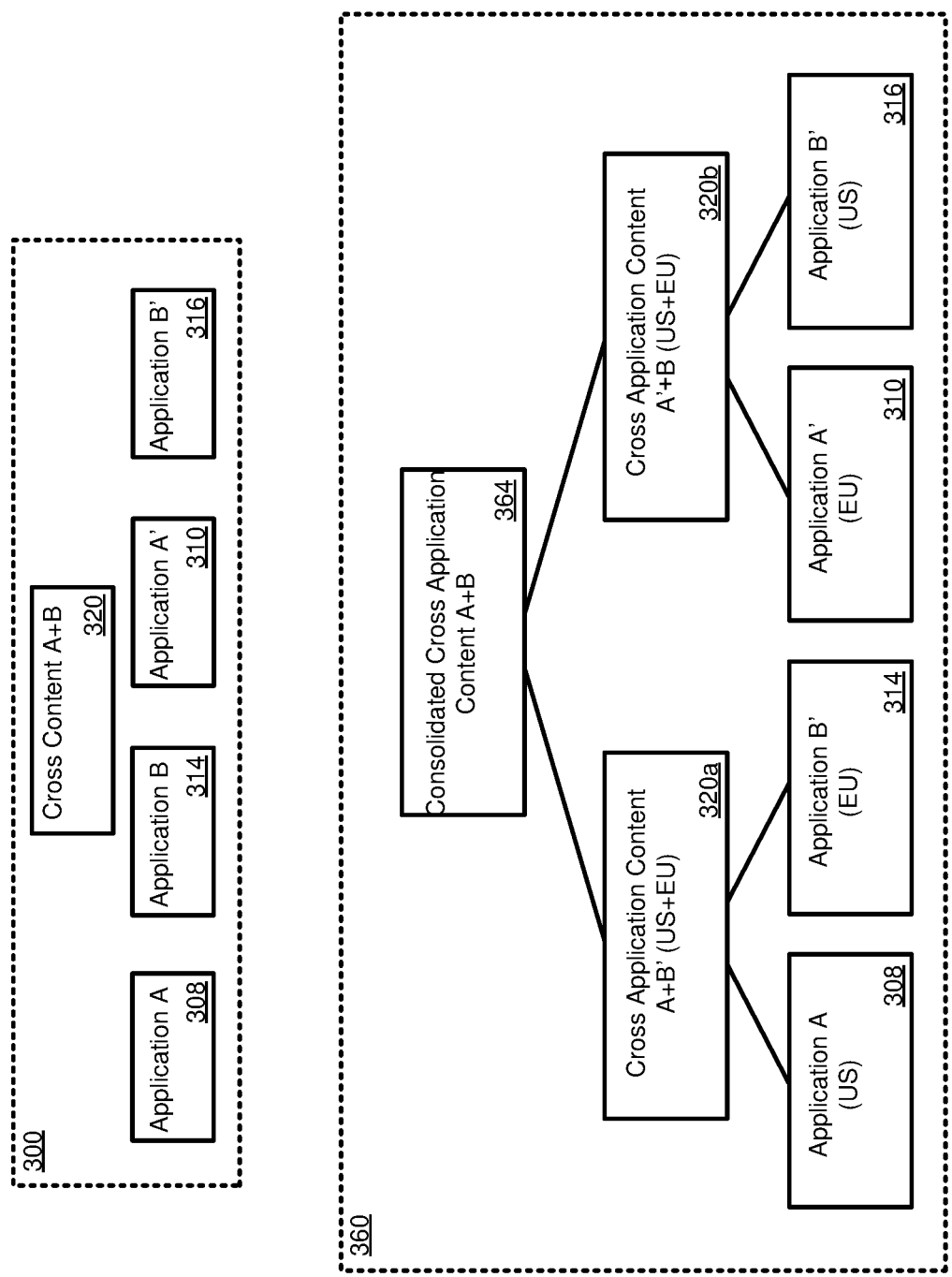

FIGS. 3A and 3B illustrate a more complex landscape 300, which has two instances 308, 310 of application A, two instances 314, 316 of application B, and cross-content 320 that can be installed when applications A and B are present. It can be seen looking at the different grouping possibilities how landscapes can quickly grow in complexity as the number of applications/content types increases, or as the number of instances of a given application/content type increases.

In a scenario 330, cross-content 320 has been installed for the first instance 308 of application A and the first instance 314 of application B. The second instances 310, 316 of applications A and B have not had cross-content installed. Scenario 334 is the reverse of the scenario 330, where cross-application content 320 has been installed for the second instances 310, 316 of applications A and B, but not for the first instances 308, 314 of application A and B.

In a scenario 340, consolidated content 342 has been generated from both instances 308, 310 of application A, and consolidated content 344 has been generated from both instances 314, 316 of application B. The cross-content 320 has been installed for the consolidated content 342 of application A and the consolidated content 344 of application B.

In a scenario 350, cross-content is installed for instances of application A and application B, and then the cross-content is consolidated. That is, a first instance 320a of the cross-content is installed for the first instance 308 of application A and the first instance 314 of application B, while a second instance 320b of the cross-content is installed for the second instance 310 of application A and the second instance 316 of application B. Consolidated cross-content 352 is generated from the two cross-content instances 320a, 320b.

The scenarios 340, 350 both represent "logical" ways of forming cross-content and of consolidating data. That is, scenario 340 groups by application, while scenario 350 groups by region. Without user intervention, or the use of disclosed grouping techniques, it may be difficult, particularly for an automated process, to determine whether the scenario 340 or the scenario 350 should be implemented, as both can be reasonable depending on a desired result. However, it is not even clear that a user might wish scenario 340 or 350 to be implemented, as a user might prefer to have scenario 330 or 334 implemented. Or, a user might wish to not have any cross-content 320 installed, or might wish to implement scenario 350, but without providing the consolidated cross-content 352.

Further, while both scenarios 340, 340, and even scenarios 330, 334, "make sense," it may be difficult for administrators or automatic processes to distinguish between these scenarios and those that do not "make sense." Scenario 360 of FIG. B is an example of an arrangement that does not make sense from a semantic perspective. That is, data could be combined as shown in scenario 360, but it is not clear why such an arrangement would be desired.

The scenario 360 shows cross-application content 320a being generated for the first instance 308 of application A (representing data from the United States) and the second instance 316 of application B (representing data from the European Union), while cross-content 320b is generated for the second instance 310 of application A (EU data) and the first instance 314 of application B (US data). Consolidated cross-application content 364 can be generated from the cross-content instances 320a, 320b. It is not clear why one would want to combine data from different regions and different applications rather than combining data by region or combining data by application. However, without understanding the "meaning" of the data, installation rules typically would not be able to distinguish between the scenarios 340, 350, 360.

Figure 4:
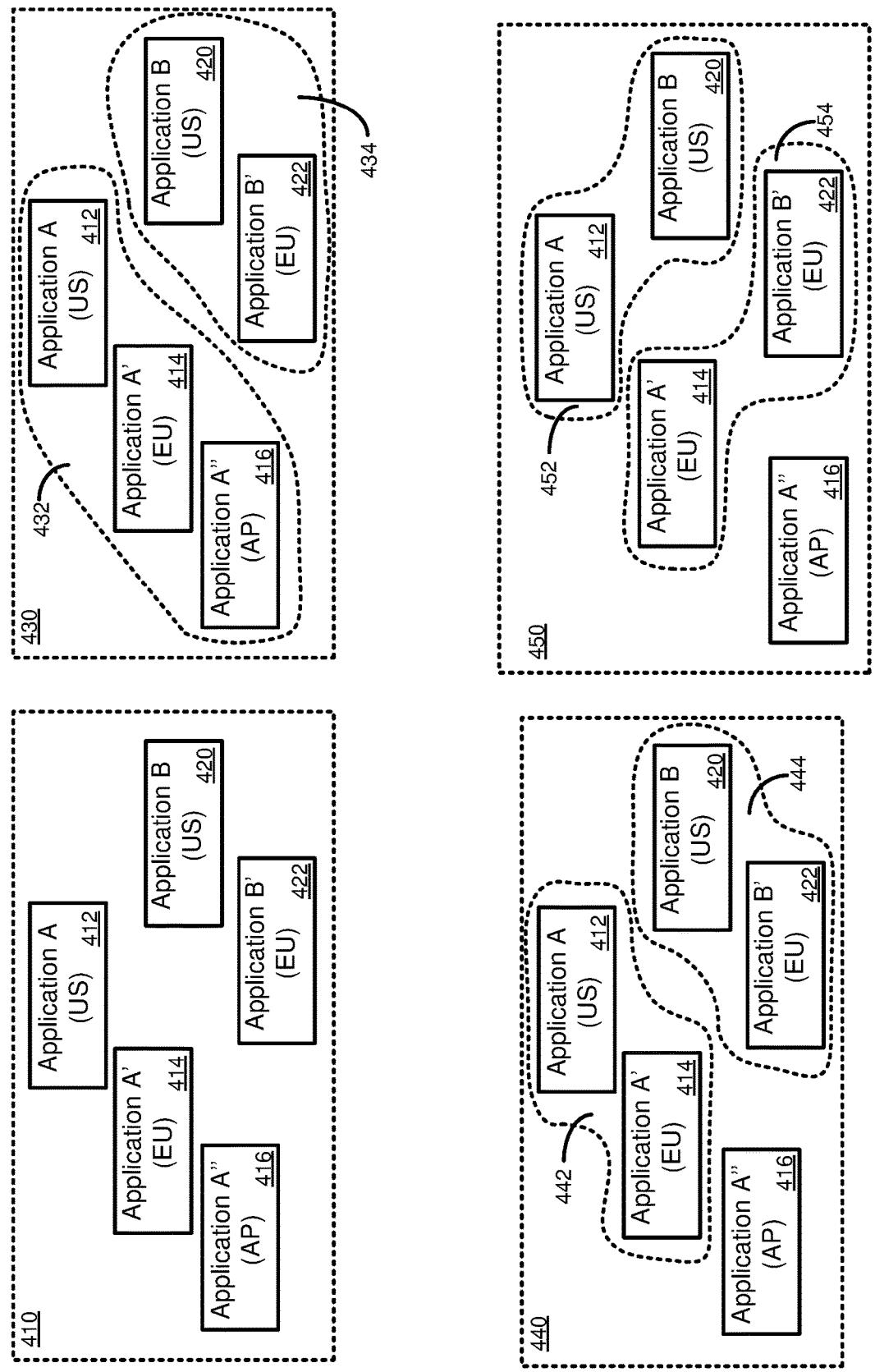
FIG. 4 is a block diagram illustrating how grouping can be used in a landscape having multiple landscape elements.

FIG. 4 illustrates how grouping can be used to define groups within a landscape, where the groups can be used, among other things, to determine how additional software/content is installed or how data is combined. A basic landscape 410, without grouping (other than that provided by the landscape itself) includes three instances 412, 414, 416 of an application A and two instances 420, 422 of an application B. Thus, it should be understood that even more options for combining data and installing cross-application content are present in FIG. 4 than in FIGS. 3A and 3B.

A landscape 430 defined two groups 432, 434, which are defined based on application type, but more generally illustrate type-based grouping, where a type could also be, for example, content type. Thus, group 432 includes all three instances 412, 414, 416 of application A, while group 434 includes both instances 420, 422 of application B.

A landscape 440 also illustrates grouping by application type, but illustrates how grouping can used to exclude landscape elements from groups. That is, while a group 444 contains both instances 420, 422 of application B, and thus is analogous to the group 434, a group 442 for application A includes instances 412, 414 of application A, but has been defined such that instance 416 of application A is excluded from the group 442. Although a variety of reasons can exist for excluding landscape elements from groups, one reason can be that cross-application content is to be installed for application A and application B, but only for US and EU data, and not for Asia Pacific data. A reason could be that, as shown in the landscape 440, an instance of application B does not exist for Asia Pacific data.

As an aside, generally, grouping can be defined manually or using rules, including rules that are user-defined, are provided as options for user selection, or which are determined by a computer-implemented process. A rule can be a default rule that is applied as long as a user does not set another rule, set a rule that has higher precedence than the default rule (e.g., if [defined landscape situation exists] use rule B, else use default rule), or disables the default rule. A default rule can be "group by type," as shown in landscapes 430, 440. For the landscape 440, the default rule can be programmed to only group instances of application A where there are corresponding instances of application B.

Note that "rules" can be completely automated, or a user or process can be presented with information that "rules" may apply and the user or process can select to implement the rule or ignore the rule. For example, if two instances of an application or content are detected, a user can be notified that a multi-instance ("multitenant") situation exists, and can choose to not implement multi-instance logic, to implement multi-instance logic, or to create multi-instance logic (such as a consolidation element, as will be further discussed) in addition to an existing scenario that does not use multi-instance features of the present disclosure.

Grouping can be carried out based on other criteria, including data or metadata associated with landscape elements, either manually or automatically. Landscape 450 illustrates "location" being used as grouping criteria, where instance 412 of application A has been grouped with instance 420 of application B in a group 452, as both instances involve data associated with the US, while a group 454 includes the instance 414 of application A and the instance 422 of application B, having data for the EU. In this case, the groups 452, 454 are defined in such a way that the instance 416 of application A having data for the Asia Pacific region is excluded from the groups.

When grouping is manually defined, groupings can be made based on any desired criteria, whether or not reflected in the data or metadata associated with a landscape element. That is, for example, a user may know that an instance of application A is associated with US data and another instance of application A is associated with EU data, and make groupings based on that information, without the landscape's elements having a formal "tag" indicating a region. Of course, in other cases landscape elements can have tags that can be used for grouping, whether the tags are also used for other purposes or are defined specifically for use in manual or automated grouping operations.

Figure 5:
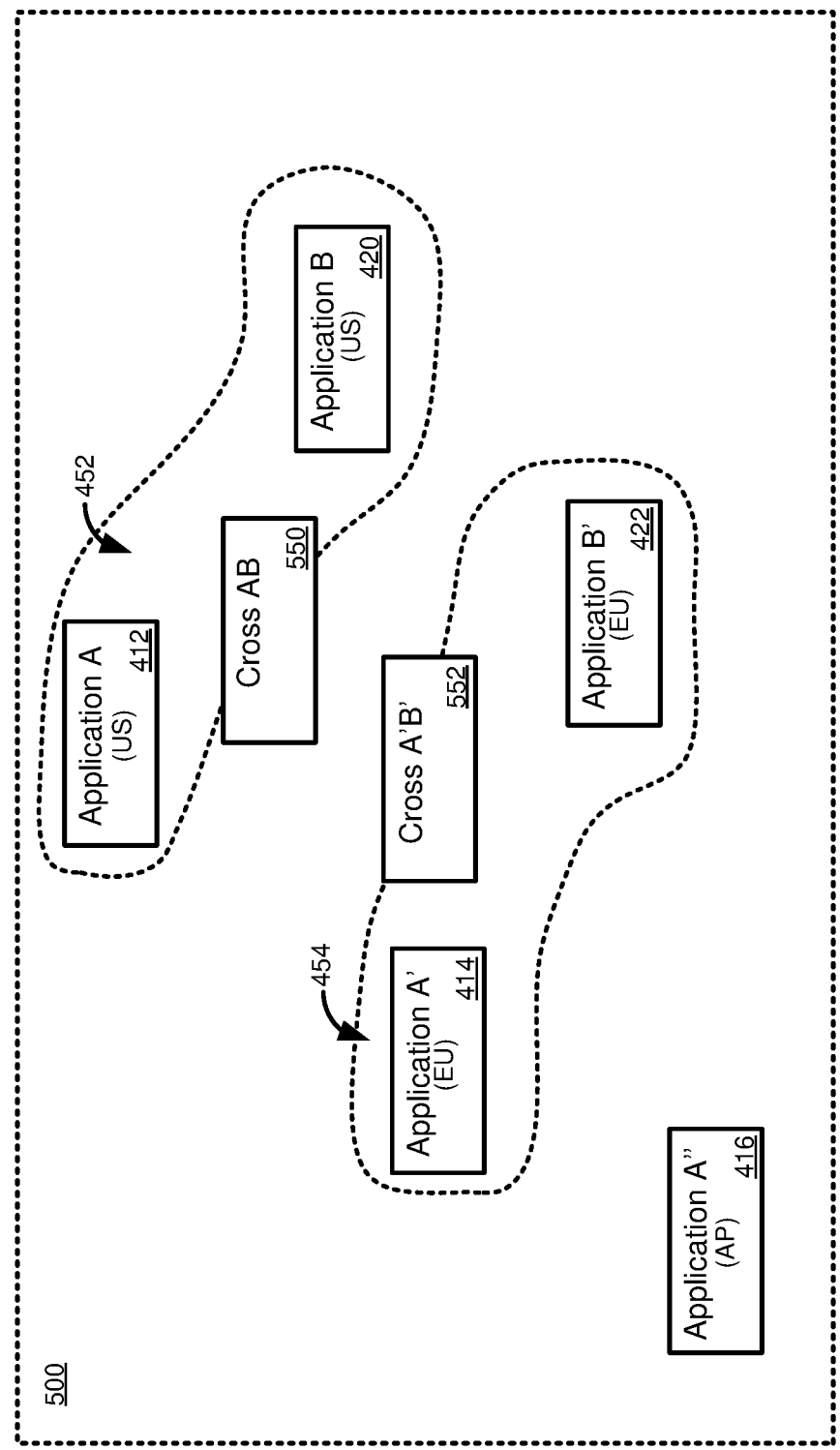
FIG. 5 is a block diagram illustrating how groupings can be used to assist in computing processes, such as the installation of cross-content.

FIG. 5 illustrates how groupings can be used to assist in computing processes, such as the installation or deployment of software or content used by software. In the scenario of FIG. 5, landscape 500 is analyzed to determine whether cross-content can be deployed that has been developed for use when an application A and an application B are present in a landscape. The scenario of FIG. 5 corresponds to the landscape 450 of FIG. 4. The groups 452, 454 can be defined manually or using an automated process.

An installation process evaluates the landscape 500. The installation process identifies group 452 as containing an instance 412 of application A and an instance 420 of application B. Since application A and application B are available in the group, an instance 520 of the cross-content is installed.

Note how the grouping helps solve previously identified issues. That is, group 452 can be evaluated as a unit, apart from other groups or elements of the landscape 500 (although in some cases, a given group can be evaluated with respect to other groups or to non-grouped landscape elements). When group 452 is evaluated as a unit, an installation procedure need not be programmed to adapt to situations where multiple instances of an application or content exist, as the grouping results in the group 452 having a single instance of each application. In addition, the grouping addresses the issue of potentially ambiguous ways that landscape elements may be grouped. That is, by grouping US data for application A and application B in group 452, an installation process (whether automated or manual) can be avoided that erroneously groups US data for application A and EU data for application B, and then installs cross-content for this group.

Continuing, the installation process can evaluate the group 454, determine that it contains an instance 414 of application A and an instance 422 of application B, and install an instance 522 of the content for the group 454.

Next, the installation process evaluates the third instance 416 of application A. Since the third instance 416 of application A is not in any other group, the landscape 500 can serve as the grouping criteria. That is, the groups 452, 454 can take precedence over the landscape 500, forming inner groups that are contained within the outer group. Since the landscape 500 does not contain an instance of application B that is not comprised within an inner group 452, 454, cross-content is not installed for the instance 416 of application A.

Figure 6:
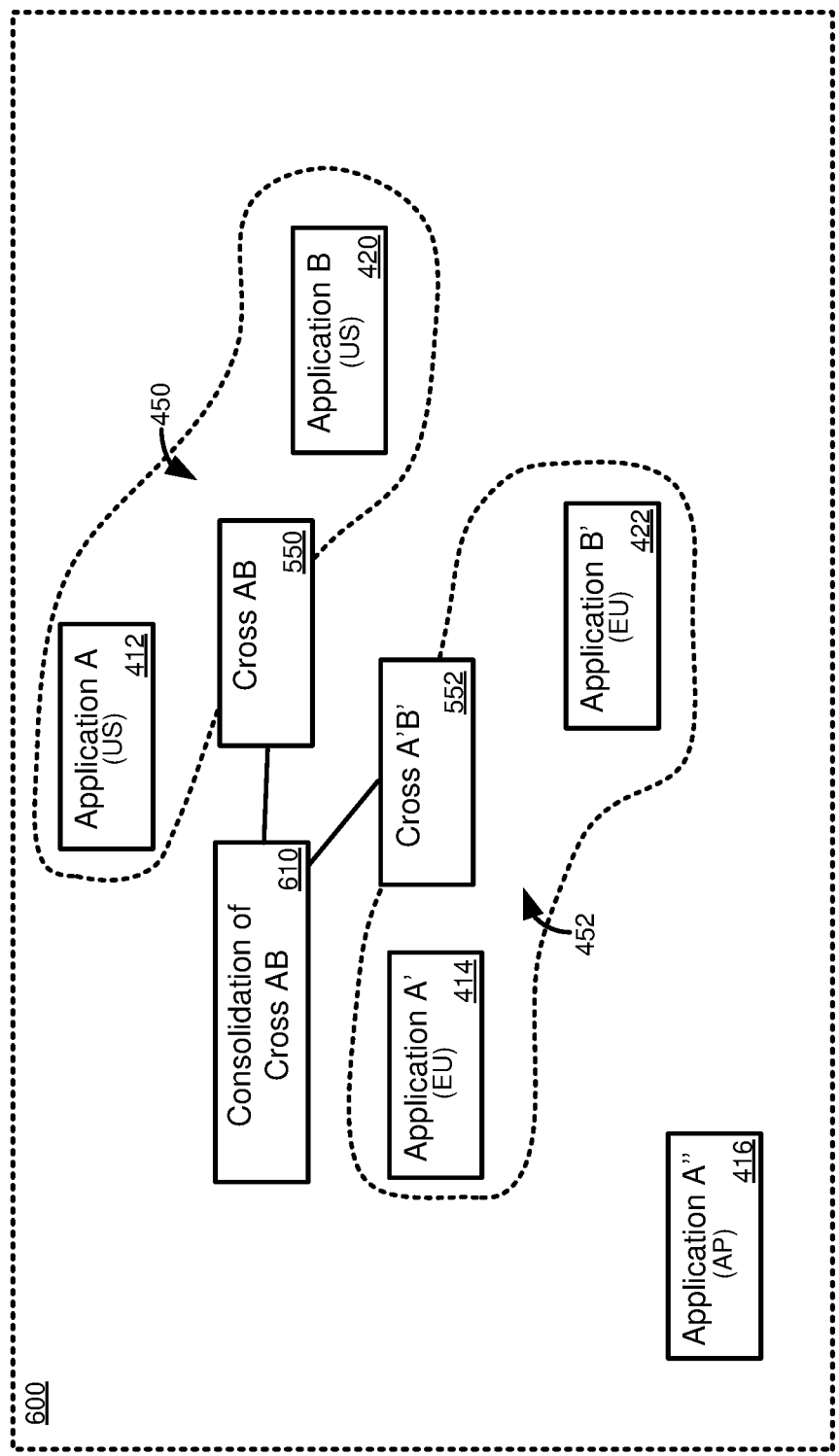
FIG. 6 is a block diagram similar to that of FIG. 5, but includes a consolidation element that can be used to consolidate multiple instances of an application or content.

Since FIG. 5 includes two instances 550, 552 of AB cross-application content, a consolidation element can optionally be included for these instances. FIG. 6 illustrates a scenario 600 where a consolidation element 610 has been added to the landscape 500 that consolidates the two instances 550, 552 of AB cross-application content.

As previously described, different rules can be provided to address nested groups. In the example just described, an inner grouping trumps an outer grouping, but otherwise groupings are handled in an analogous manner. In other cases, actions can be defined to be taken only for inner groups—not to be taken if the only grouping that may exist for a particular landscape element is a grouping provided by the landscape itself. Take, for example, the landscape 500, but now including an additional instance of application B, containing data for operations in South America. If a rule is defined that provides for the installation of cross-content for application instances that are grouped by landscape (not a specified grouping within a landscape), then an instance of cross-content for the third instance 416 of application A and the additional instance of application B will be installed, even though in this example such an installation may be considered an erroneous result. If a rule is defined that does not provide for the installation of cross-content for landscape elements only grouped by the landscape, then the cross-instance would not be installed.

Rules regarding the use of groups can be applied regardless of grouping criteria, at least in some implementations. That is, what may be analyzed are what groups exist (and optionally a type associated with a group), not the criteria used to define a group (which criteria need not even be associated with a group). That is, one group could be defined based on geography (with multiple different types of applications or content within a selected geographic area potentially being included in a group), while another can be group based on application or content type, regardless of geography. The groups can be treated independently, without concern as to what criteria was used to form a group. Note that elements available to be grouped can be constrained, such as within an overall landscape that is presented to a particular user or process for grouping.

Figure 7:
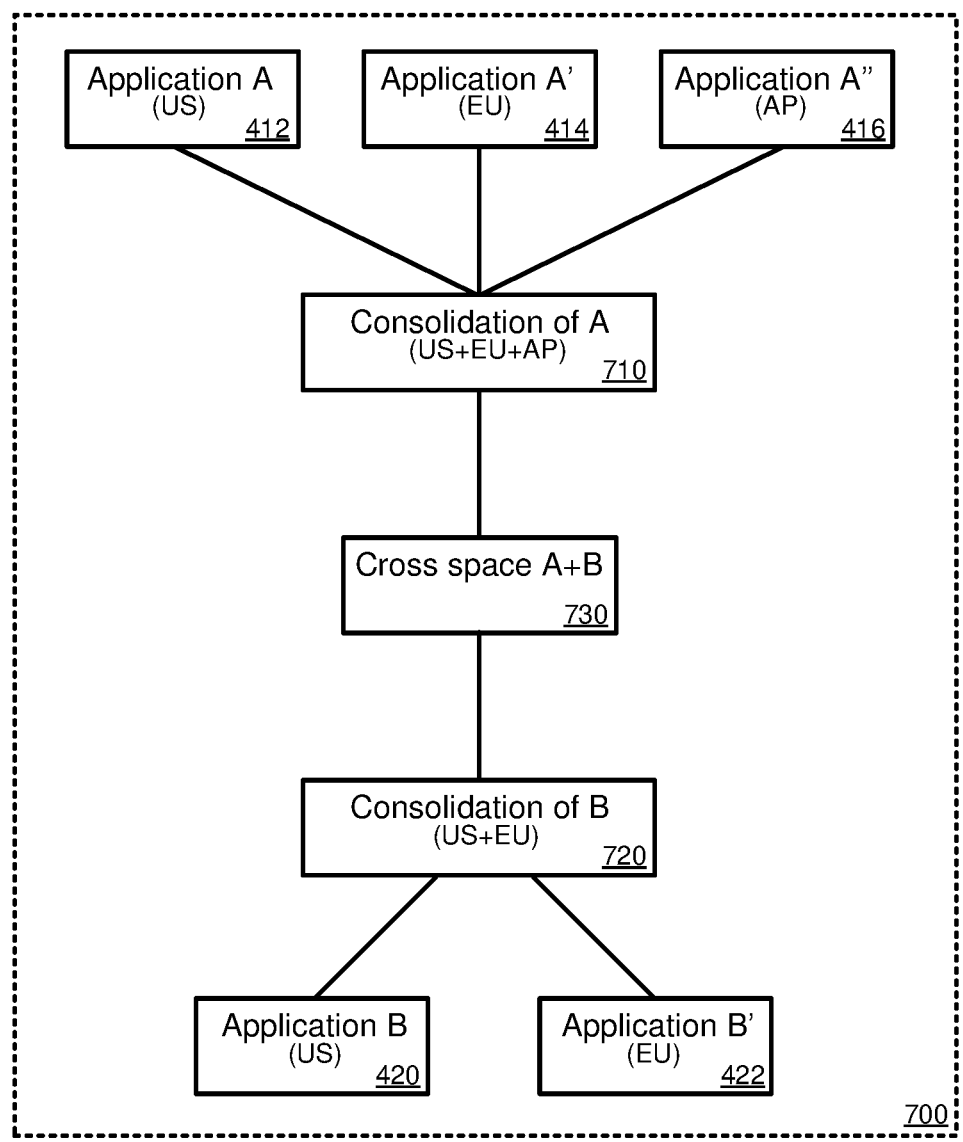
FIG. 7 is a block diagram illustrating how consolidation elements can be used in a landscape, including landscapes having the example elements of the landscapes illustrated in FIGS. 5 and 6.

FIG. 7 illustrates a landscape 700 that includes the same basic elements as the landscapes 500 and 600. The landscape 700 can be created based on those basic elements and combination rules, without necessarily requiring grouping (although groupings could be defined). That is, the landscape 700 can be created using a rule that combines multiple instances of the same application or content and a rule that installs cross-application content when an instance of application A and an instance of application B are available.

The landscape 700 can be analyzed for application of the first rule. The three instances 412, 414, 416 of Application A are identified, and are combined by a consolidation element 710 for application A. The two instances 420, 422 of application B are identified, and are combined by a consolidation element 720 for application B. Application of the second rule identifies that a (single) instance 710 of consolidated data for application A exists, and that a (single) instance 720 of consolidated data for application B exists, and so an instance 730 of cross-application content can be used for the consolidation elements 710, 720.

Grouping the instances 412, 414, 416 of application A and the instances 420, 422 of application B can assist in defining the landscape 700. For example, grouping the instances 412, 414, 416 of application A can be an affirmative sign that the instances should be considered together, including for the purposes of installing cross-application content or consolidating content of the instances. For the reasons discussed earlier, a blanket rule to consolidate application instances may not always be applicable/be consistent with a user's wishes. Similarly, a user may wish to exclude one or more application instances from the cross-content.

Figure 8:
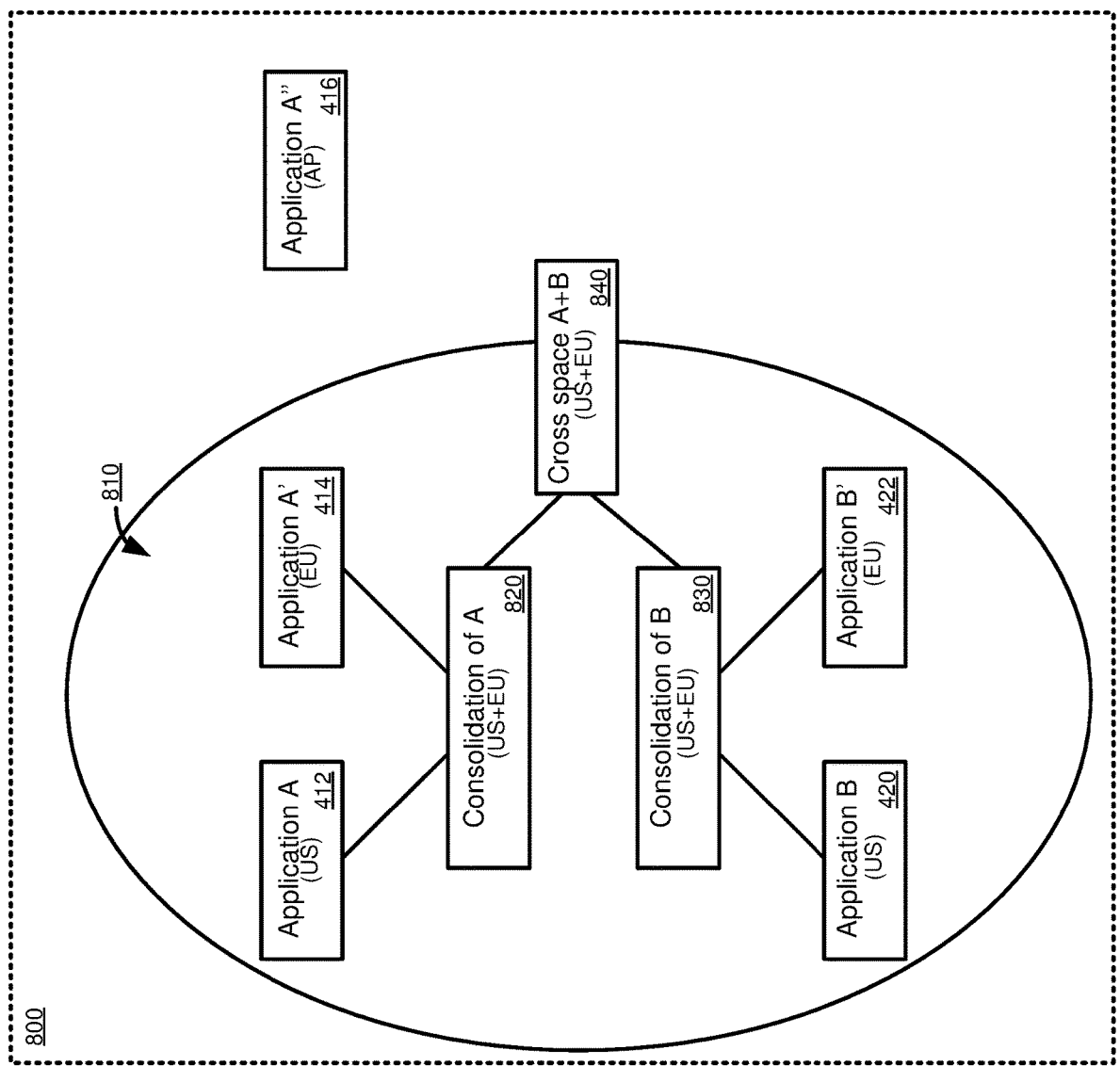
FIG. 8-12 are block diagrams illustrating how grouping can be used to define a landscape, such as for the inclusion of consolidation elements or cross-content, and further illustrating that grouping can be used to exclude landscape elements from groups.

FIG. 8 illustrates a landscape 800 demonstrating how grouping may be used to define or guide more complex scenarios involving consolidation of applications or content. Even if the landscape 700 can be generated using default rules, it may be that landscape is not appropriate in all situations. So, not only can grouping help guide behavior to generate the landscape 700, but it can also be used to override grouping rules to generate a landscape with a different configuration.

In particular, in the landscape 800, a group 810 has been defined that includes the application instances 412, 414, 420, 422, representing data for the US and the EU, but has been defined to exclude the instance 416 of application A that has data for the Asia Pacific region. Application of the rules described in conjunction with FIG. 7 to the landscape 800 provides a consolidation element 820 that combines that content of instances 412, 414 of application A and a consolidation element 830 that combines the content of instances 420, 422 of application B. A cross-content instance 840 is created for the consolidation elements 820, 830. As with the landscape 700, additional groupings can optionally be included to help guide the formation of consolidation elements and the installation of cross-application content. For instance, in some situations it may be desirable not to consolidate certain data, or not to install certain cross-application content.

Figure 9:
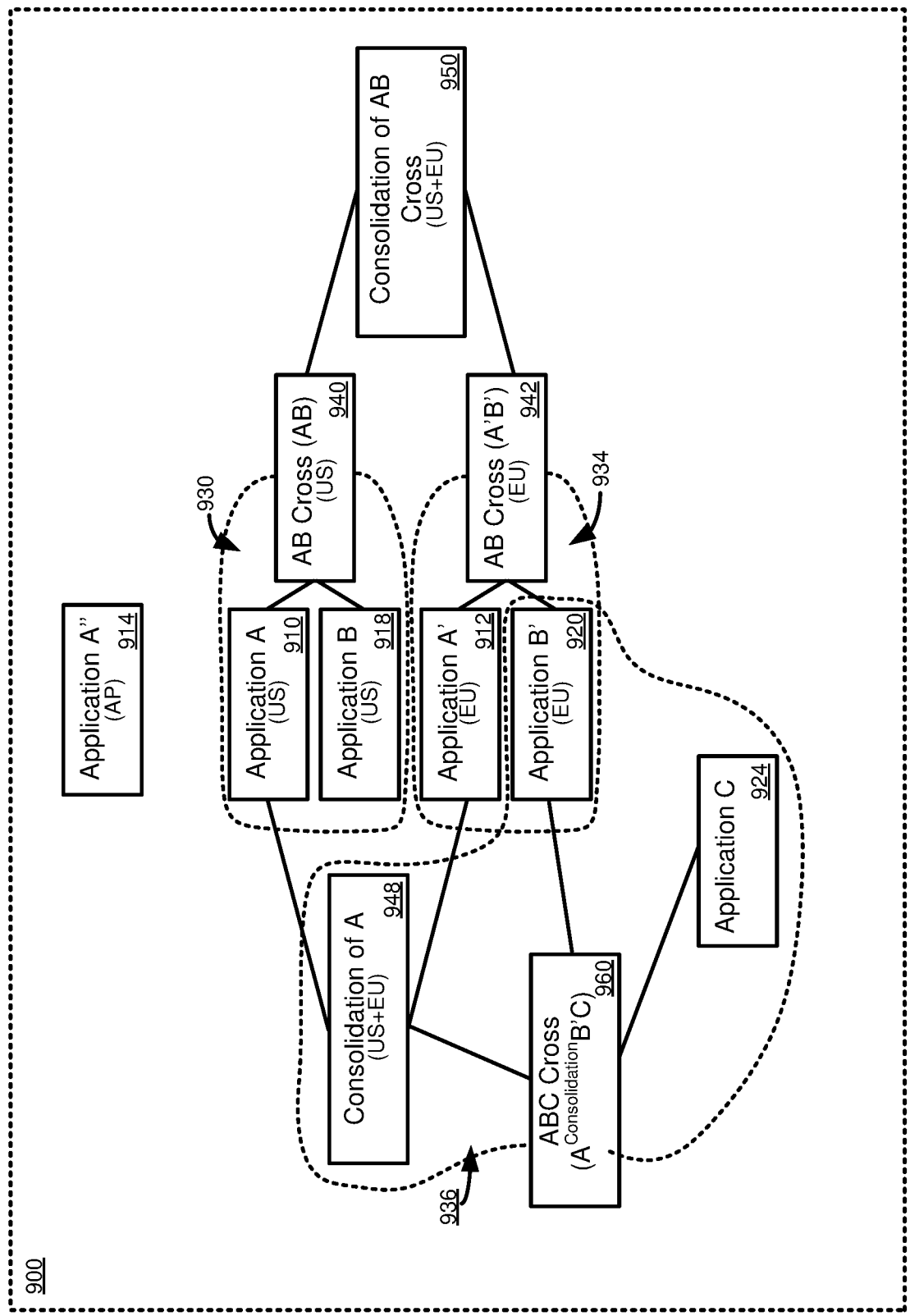

FIG. 9 illustrates a scenario that is even more complex than those previously described, where three applications are in a landscape and one or more of the applications has multiple instances. In particular, FIG. 9 illustrates a landscape 900 with three instances 910, 912, 914 of an application A, two instances 918, 920 of an application B, and a single instance 924 of an application C. In this scenario, two types of cross-application content are available. Cross-application content is defined for situations where applications A, B, and C are all available. Cross-application content is also defined for situations where applications A and B are available.

Three groups are defined for the landscape 900. A group 930 includes the first instance 910 of application A and the first instance 918 of application B, which can represent different applications being used within the same geographic area. A group 934 includes the second instance 912 of application A and the second instance 920 of application B. The groups 932, 934 can be used to install instances 940, 942 of cross-application content defined for the combination of applications A and B.

The landscape 900, either using a grouping that is not shown or a defined rule, includes consolidation elements 948, 950, where the consolidation element 948 consolidates data for the instances 910, 912 of application A, and the consolidation element 950 consolidates the instances 940, 942 of cross-application content defined for applications A and B.

A group 936 includes the consolidation element 948 for application A, the second instance 920 of application B, and the single instance 924 of application C. Since the group 936 includes an instance of each of applications A, B, and C, an instance 960 of the cross-application content defined for applications A, B, and C can be installed for the group 936.

By defining the group 936 as shown in FIG. 9, both consolidation elements and cross-application content can be controlled. That is, by defining the group 936 such that it excludes the first instance 918 of application B, no consolidation element is created for application B. Similarly, since the first instance 918 of application B is not in the group 936, no application A, B, C cross-content is installed that includes the first instance of application B.

Figure 10:
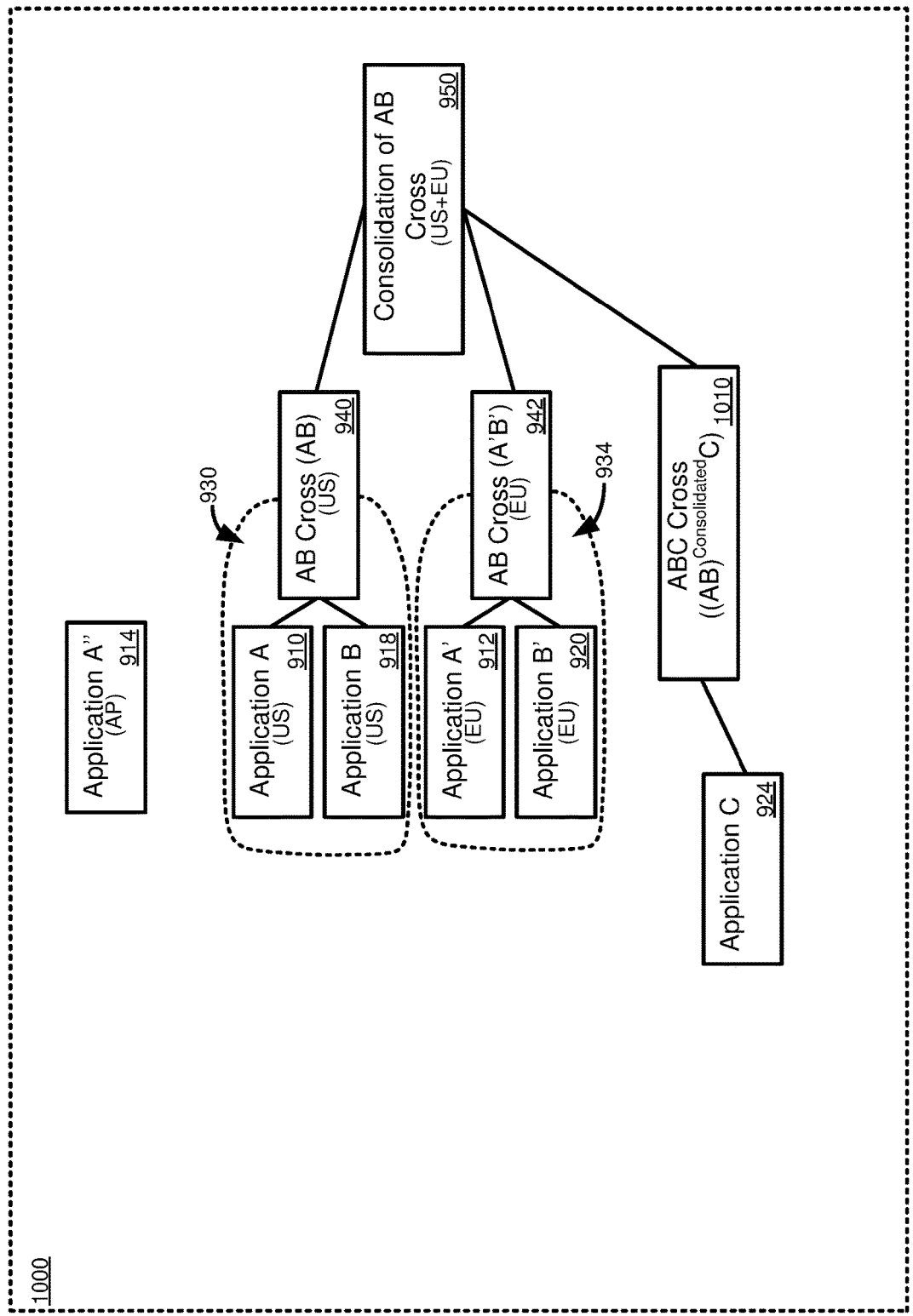

FIG. 10 illustrates an alternative landscape 1000 that can be generated from the application instances of FIG. 9. The landscape 1000 is generally similar to the landscape 900, but does not include the group 936. When the landscape 1000 is being analyzed to determine whether cross-application content for the combination of applications A, B, and C can be installed, it can be determined that a single instance 950 of application AB cross-content exists, which can be treated as a single instance of application A data and a single instance of application B data (since the AB cross-content is linked to instances of application A and application B). Thus, when it is determined that a single instance 924 of application C exists, an instance 1010 of ABC cross-application content can be installed using the consolidation element 950 and the instance 924 of application C.

Figure 11:
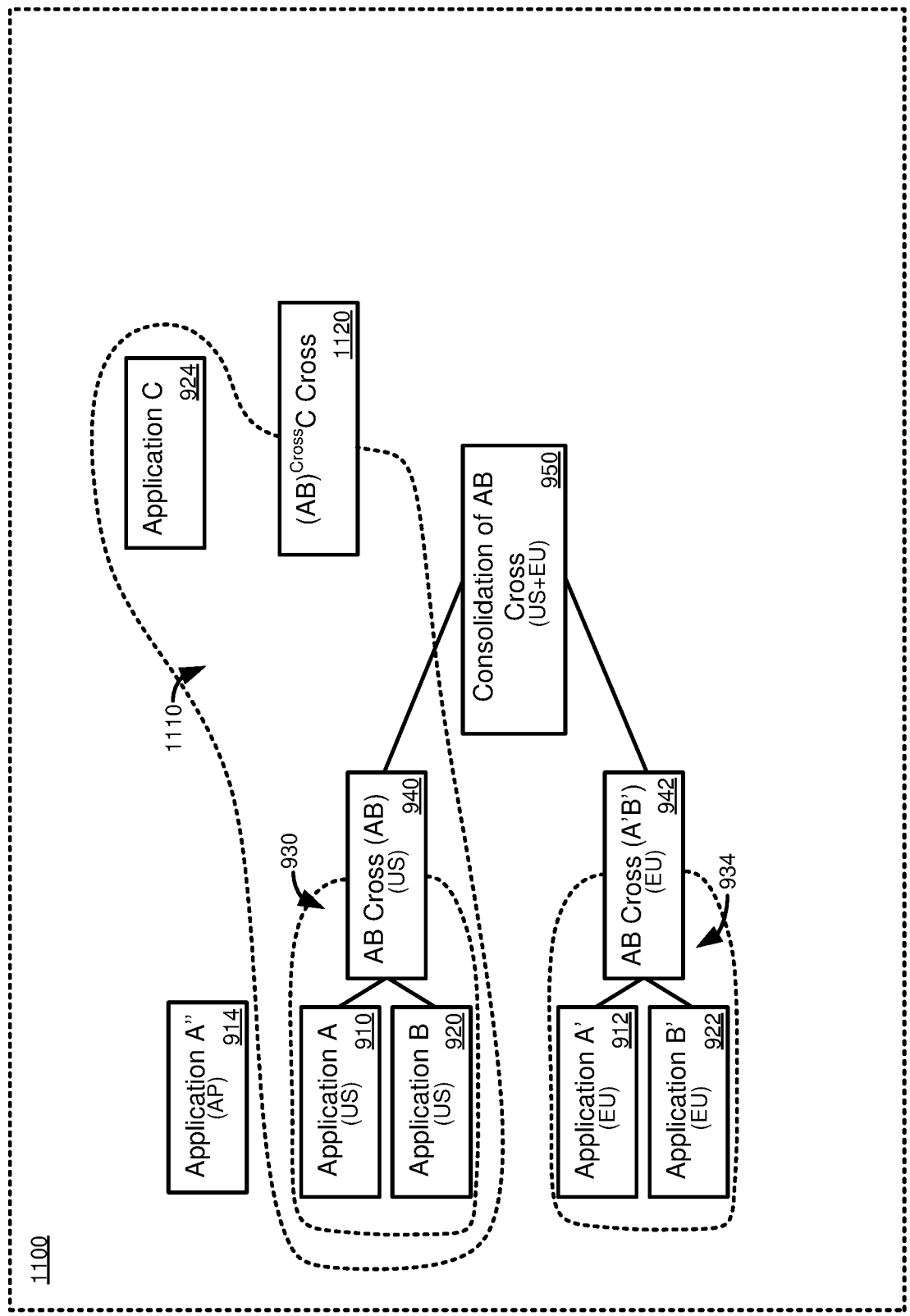

A landscape 1100 shown in FIG. 11 illustrates how ABC cross-application content can be installed for a single instance of AB cross-application content, rather than installing the cross-application content for all instances of AB cross-application content.

The landscape 1100 is generally similar to the landscape 900, including the instances 910, 912, 914 of application A, the instances 920, 922 of application B, the groups 930, 934, the AB cross-application content instances 940, 942, and the consolidation element 950 of AB cross-application content. However, the landscape 1100 includes the definition of a group 1110 that includes the instance 940 of AB cross-application content and the instance 924 of application C, but excludes the AB cross-application content instance 942 and the consolidation element 950 for application AB cross-application content. Since only the instance 940 of AB cross-application is grouped with the instance 924 of application C, ABC cross-application content 1120 be installed for the landscape 1100, but only with respect to the elements in the group 1110.

Figure 12:
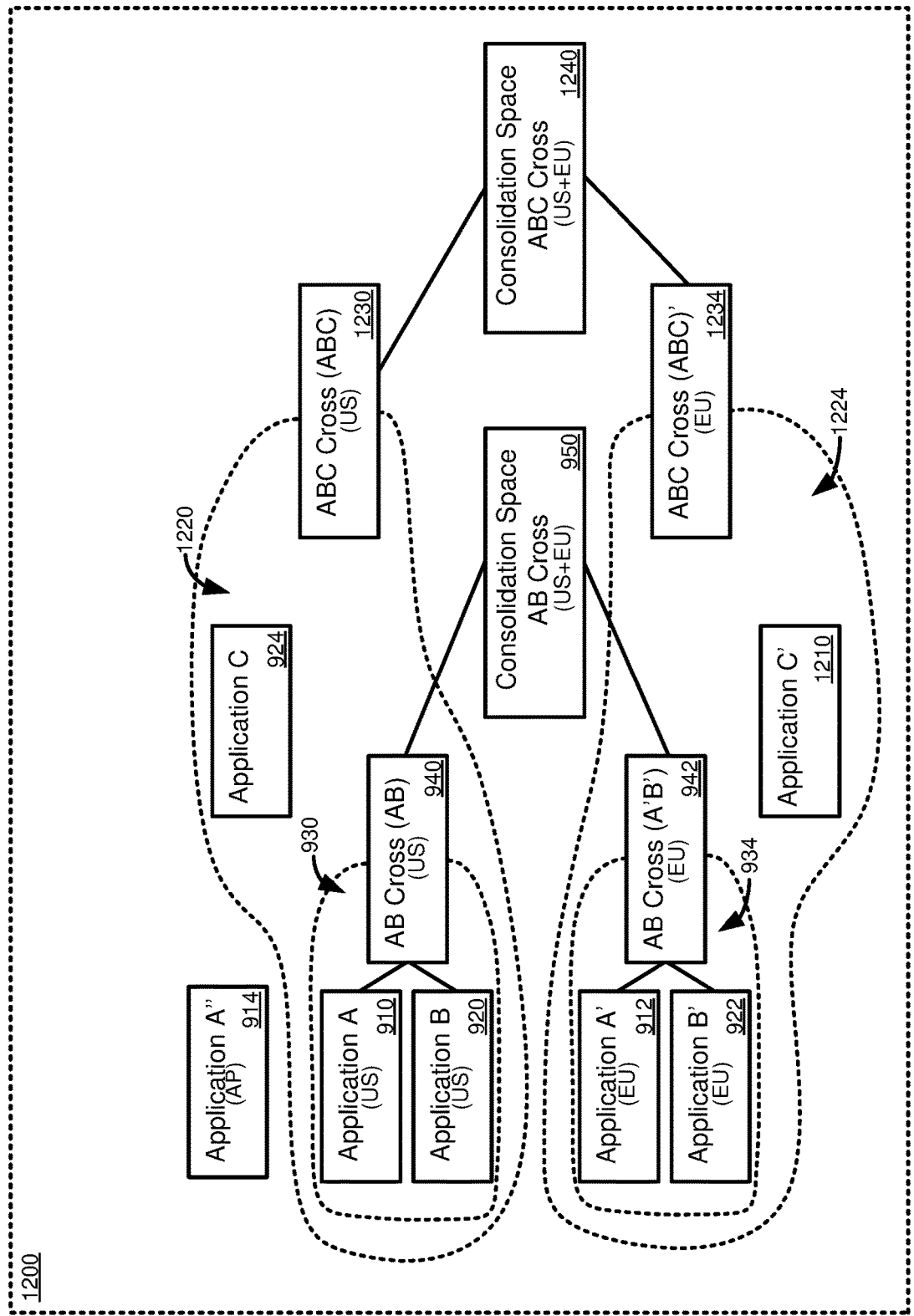

As a final example of how groupings can be used to control the generation of consolidation elements and the installation of cross-application content, consider the landscape 1200 of FIG. 12. The landscape 1200 is generally similar to the landscape 900, including the instances 910, 912, 914 of application A, the instances 920, 922 of application B, the groups 930, 934, the AB cross-application content instances 940, 942, and the consolidation element 950 of AB cross-application content. In this case, the landscape 1200 includes the instance 924 of application C and a second instance 1210 of application C.

A group 1220 includes the group 930 and its constituent elements, the instance 940 of AB cross-application content, and the instance 924 of application C. As the group 1220 contains instances of all of applications A, B, and C, an instance 1230 of ABC-cross-application content can be installed for the group 1220. In an analogous manner, a group 1224 includes the group 934 and its constituent elements, the instance 942 of cross-application content for applications A and B, and the instance 1210 of application C. Since the group 1224 contains instances of all of applications A, B, and C, an instance 1234 of ABC cross-application content can be installed for the group 1224. Since there are two instances 1230, 1234, a consolidation space 1240 for the ABC cross-application content can optionally be created (or automatically created, if appropriate, using the application of automated rules).

Example 3—Example Group Identification

FIG. 13 illustrates a technique for maintaining grouping information, although grouping information can be maintained in other ways without departing from the scope of the present disclosure. Grouping information can be maintained in a variety of ways, such as defining a group and listing for the group landscape elements, or artifacts associated therewith, that are comprised within the group, or providing for individual landscape elements, or artifacts association therewith, an identifier of any group or groups to which a respective element belongs. Grouping identifiers can be included in a definition, description, or declaration of a landscape element, or this information can be maintained in another structure.

A table 1350 can be used to maintain membership information. The table includes a column 1352 identifying a particular package, such as an installation package, which can correspond to applications or content. As has been discussed, there can be multiple instances, or "tenants," of an application or content, which can be specified in a column 1354. These instances can be a type of "landscape element," as that term is used in the present disclosure.

The table 1350 can include one or more columns 1358 for tracking group memberships. In some cases, a landscape element or artifact thereof can belong to multiple groups. Groups can be nested or non-nested. If nested groups are permitted, the different columns 1358 can represent increasing or decreasing levels of nesting. Membership in non-nested groups can be indicated by having multiple entries in the table for a given element, each having a group identifier for a respective non-nested group (and optionally additional values for the columns 1536 to indicate nesting with a given independent group).

The primary key for the table 1350 can depend on whether nesting is permitted. If neither nesting nor multiple group membership is permitted, then the primary key for the table 1350 can be formed from the columns 1352, 1354, 1356. If nesting or multiple group membership is permitted, then the columns 1352, 1354, 1356, and the first instance of the columns 1356 can serve as the primary key.

In other example, grouping information can be maintained for particular landscapes or landscape elements, as that term is used in the present disclosure. In the case of an overall landscape, grouping information can be maintained in a table having the information of the table 1350, or maintaining equivalent information in an instance of a data structure or a datatype, such as including the information in a JSON document, or in metadata associated with a landscape (or landscape elements). Or the grouping information can be maintained in metadata for, or otherwise in association with, a landscape element (where a collection of landscape elements can be queried to collect/identify landscape elements in particular groups, wherein this information can optionally be stored for an overall landscape).

Example 4—Example Consolidation Element Implementation

As has been discussed, landscape elements can be consolidated for a landscape. Various aspects of the present disclosure are not limited to any particular consolidation mechanism. However, the present disclosure provides an innovative consolidation space that can serve this purpose.

A consolidation space serves as a separate "space" from "spaces" that are being consolidated. For instance, an application may be associated with a particular namespace or modelling space. Examples of modelling spaces include physical or virtual data models or schemas, such as physical or virtual schemas for a relational database.

The use of a separate space for consolidation can provide a number of advantages. One advantage is that, other than creating a specific space for consolidation purposes, existing technologies can be used to implement a consolidation space. For instance, the consolidation space can include views that reference data artifacts (e.g., tables or views) in the spaces being consolidated.

Figure 14:
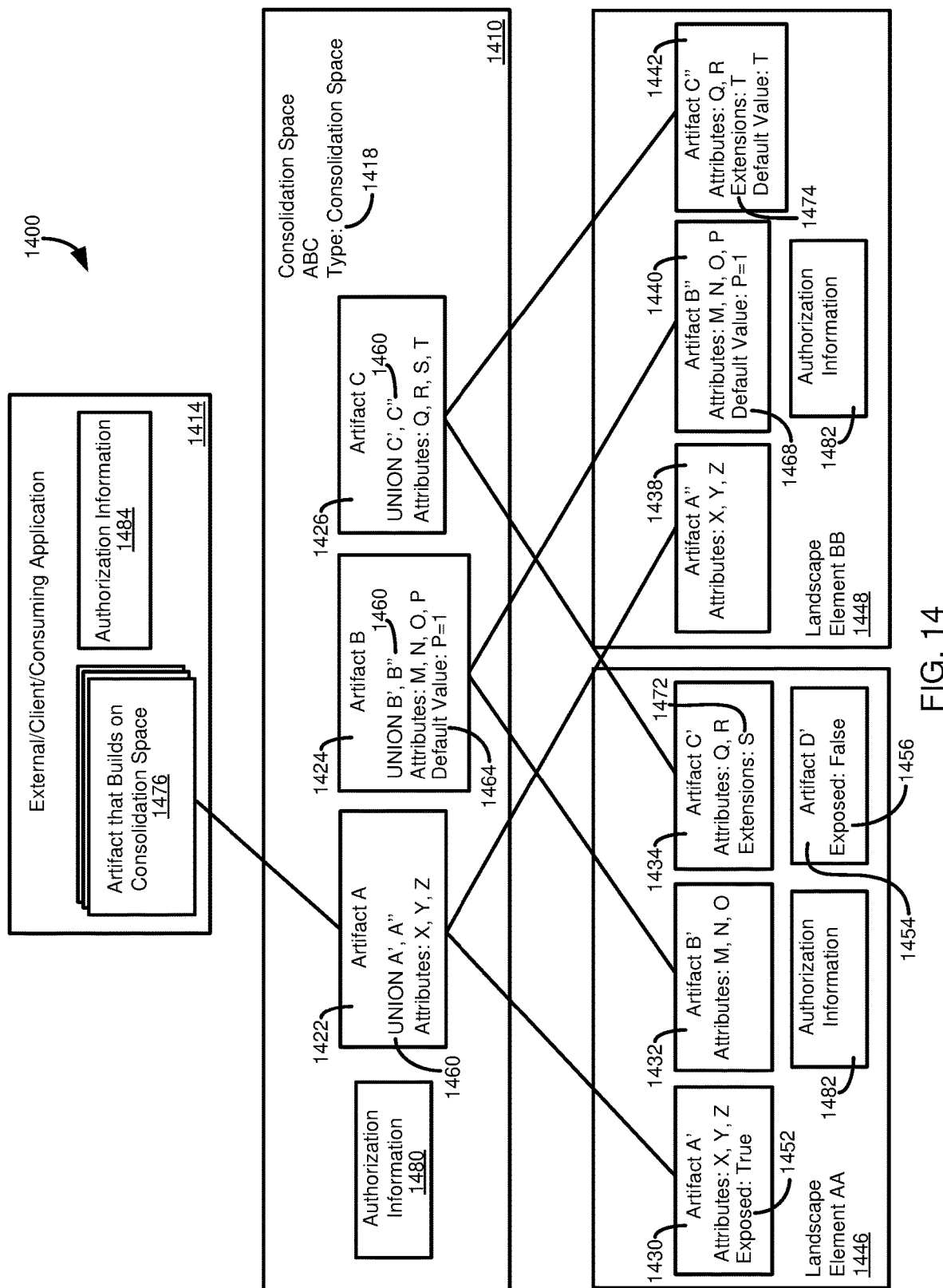
FIG. 14 illustrates a landscape having a plurality of landscape elements that are combined using a consolidation space, where the consolidation space is accessible to an external client or consuming application.

FIG. 14 illustrates an example computing environment 1400 that includes a consolidation space 1410 that can be referend by an external application 1414, which can also be referred to as a consuming application or a client.

Consolidation spaces can be defined, such as the instantiation of a database schema. As part of the definition, the consolidation space 1410 can include metadata 1418 that identifies the space as a consolidation space, or the consolidation space can otherwise be identified as being a consolidation space. In some database systems, similar methodologies can be used to identify particular spaces as being for development, testing/quality assurance, or production. So, a space can be given a tag in a similar manner as for indicating that a space is for "development," but instead indicating that the space serves the purposes of consolidating data from other spaces (such as instances of an application or content). However, one difference from tags indicating whether a space is "development" etc. is that consolidation spaces are generated from other spaces (e.g., landscape elements, as that term is used in the present application) and thus has a lifecycle that is dependent on the underlying, consolidated spaces.

The consolidation space 1410 is shown as including three consolidation artifacts 1422, 1424, 1426 that reference corresponding artifacts 1430, 1432, 1434 in landscape element 1446 and corresponding artifacts 1438, 1440, 1442 in landscape element 1448.

One consideration for a consolidation space is to what extent content from consolidated spaces should be included in the consolidation space. If desired, all content, such as all artifacts, in a consolidated space can be addressed by the consolidation space (e.g., by having corresponding artifacts that reference artifacts in the consolidated spaces). However, it may be unnecessary, at least in some cases, to have artifacts or elements (such as views), referred to as consolidation artifacts or consolidation elements, for artifacts or elements of consolidated landscape elements. In particular, in many cases a landscape element to be consolidated has artifacts (or other elements/contents, where the term artifact will be used for simplicity of presentation) that are not exposed externally. For instance, a consolidated space may have a view stack, where one or more views at upper levels of the stack are exposed—available to be used by—external users, but where lower-level views or artifacts (such as tables) are not exposed to external users. In other cases, individual artifacts, such as tables, can be exposed to external users, and thus consolidation elements can be created for such artifacts.

Accordingly, when a consolidation space is defined, in some cases consolidation artifacts can automatically be populated into the consolidation space by examining the artifacts in the relevant consolidated spaces. Artifacts in the consolidated spaces can be annotated, or otherwise configured, to indicate whether they are exposed to clients/externally. Artifact 1430 of FIG. 14 has an annotation 1452 indicating that it is exposed externally, while an artifact 1454 has an annotation 1456 indicating that it is not exposed externally. Rather than being part of an artifact definition, exposure information can be in other metadata (including a flag associated with an artifact) associated with an artifact, or such information can be collected centrally. For example, a table can store artifact identifiers and indicators of whether they are exposed for outside consumption. Or, the table can simply store identifiers of exposed artifacts.

In particular, these "exposure" annotations can be implemented as, or in a manner similar to, technologies available from SAP SE, of Walldorf, Germany, including definitions in core schema notation (CSN) that may be used in a virtual data model (such as Core Data Services views). So, when a consolidation space is defined, a process can examine a schema to determine exposed schema elements (such as artifacts or particular attributes of particular artifacts) and then cause the creation of a corresponding consolidation artifact in the consolidation space, and implementing a process to obtain data from the underlying artifacts. In particular, a UNION view can be created that combines data from two or more consolidated artifacts, as indicated by the union operations 1460 for the artifacts 1422, 1424, 1426 of the consolidation space 1410.

Regarding consolidation spaces, generally, in some cases a consolidation space can be created for all elements within a landscape, even if multiple instances of an element do not yet exist such that the consolidation space is needed. Similarly, a consolidation space can optionally include exposed artifacts from an underlying space that are not consolidated, such as because only a single space exists or because a consolidation space references multiple underlying spaces, but one space has one or more artifacts that do not have a counterpart in another of the consolidated spaces. As with artifacts that do exist in multiple consolidated spaces, any artifacts that are in a consolidation space that do not currently consolidate multiple artifacts can be those that have specific properties, such as being indicated as exposed externally.

Creating a consolidation space by default can be advantageous, as external users/developers may be able to assume the presence of a consolidation space when developing external applications/configuring processes to obtain data from a landscape. If the consolidation space is implemented as described above, as a schema, then the space/overhead with creating a consolidation space can be reduced.

An issue that can arise with consolidation spaces is how to reference the consolidation space. That is, an arbitrary application may not "know" that both a consolidation space and the underlying consolidated elements exist. Thus, an issue can be how requests from the client can be directed to the consolidation space instead of one of the underlying consolidated elements. In some cases, artifacts referenced by an external user have a logical name that is consistent across landscape elements. It can be determined whether a referenced landscape element or artifact is associated with a consolidation space. If so, references to the logical name can be directed to the appropriate consolidated landscape element/artifact within a consolidation space. If not, the logical names can be directed to a "base" (unconsolidated) landscape element or a "base" artifact.

Issues can arise where landscape elements being consolidated by a consolidation space are associated with different versions, such as having two versions of a software application or content that are consolidated. It may be that one version of a software application has artifacts that are not present in another version of the software application. Or, two versions of a software application may have the same artifact, but the definition of the artifact may differ between the versions, such as a table or view in one version having a field/attribute that is not present in the other version. FIG. 14 provides an example of this situation, where a first version of an artifact, artifact 1440, as an attribute ("P") that is not present in a second version of the artifact, artifact 1432.

Rules can be developed for an overall consolidation process, for particular landscape elements, or for particular artifacts of particular landscape elements. One possible rule is that the newer version of a landscape element or artifact will be used if multiple versions exist. Another rule is that an older version of a landscape element or artifact will be used. Using an older version can help maintain data consistency between versions, as typically newer versions of a landscape element will add data artifacts/attributes while maintaining prior data artifacts/attributes. However, this approach may result in new data artifacts or attributes not being available for external use, or at least in a consolidated manner, for extended time periods. In addition, it may be difficult to determine when all instances of a landscape element or artifact have been updated to a common version, which could otherwise trigger an update to the consolidation space (such as to add a consolidation artifact or modify a consolidation artifact to reflect changes to the consolidated artifacts). In addition, some cross-application content may require a particular application version to be installed before a the cross-application space be created/cross-application content installed.

Union views can be defined such that data artifacts that do not have particular attributes can have NULL values generated for such attributes, including in data stored in association with a consolidated artifact. Thus, if a rule is defined where a latest version of a landscape element/artifact is used, cross-application content can be installed (or other processes can proceed which require a latest version of a landscape element/artifact), since both landscape elements/artifacts have the attribute available, even if not all artifacts/landscape elements have values other than NULL values.

Having a rule where a latest version of a landscape element/artifact is used can avoid issues described above. However, since NULL values may be encountered from non-updated landscape elements/artifacts, consuming processes may need to account for the possibility of NULL values, including in calculations performed using data associated with a consolidated artifact.

"Missing values"/attributes can be handled in other manners. In one implementation, an artifact in the consolidation space can be annotated to indicate a default value to be used if a corresponding artifact in a consolidated element does not have a value for a particular attribute, such as the default value 1464 for the artifact 1424. Or, it can be specified, such as using an annotation, that if a first consolidated artifact in a first consolidated landscape element does not have a value for a particular attribute. then values from a corresponding second landscape artifact in a second consolidated landscape element should be used. In yet another implementation, artifacts in the landscape elements can be annotated to specify a default value for an attribute, where that value is used for artifacts of other landscape elements that do not include that attribute, such as the annotation 1468 for the artifact 1440. Although described with respect to attributes added by extension, similar techniques can be used to handle discrepancies between artifacts resulting from version differences in consolidated landscape elements.

Artifacts within a landscape element can have extensions, including as implemented in artifacts expressed in CSN, including CDS views, as implemented in products available from SAP SE, of Walldorf, Germany, and as described in U.S. application Ser. No. 17/140,007, filed Apr. 5, 2022, and entitled "Propagation of Extensions of Data Artifacts," incorporated by reference herein to the extent not inconsistent with the present disclosure. Extensions are illustrated in the computing environment 1400, where a first version of an artifact, 1434, includes an extension 1472 that is different than an extension 1474 for a second version of the artifact, 1442.

Extensions can be handled in a similar manner as described above for versions. That is, rules can be set to use a non-extended version of an artifact or an extended version of an artifact, when both exist, or to merge (such as by a UNION operation) two instances of an artifact, both having extensions, but where the nature of the extensions differ. In some cases, whether extensions are the same or not is determined by a name or identifier of the extension, where extensions with the same identifier are considered to be the same and those with different identifiers are considered to be different.

Extensions can present additional complications, such as when two extensions have the same name and the same attribute, but the attribute has a different type (such as a datatype) in one artifact than in another. In some cases, rules can be set that such differences can be resolved via cast operations, where a particular landscape element, data artifact, or datatype can be indicated as preferred, and cast operations can be used to convert the data of other datatypes into the datatype of the preferred source of the extension attribute. In other cases, type conflicts can be resolved by treating the extensions with the differing extension element datatypes as different extensions, at least with respect to the extension element with conflicting types. The names of the conflicting extension elements can be made to be unique to differentiate between them when they are both included in a consolidation artifact.

Updates can be made to landscape elements that are consolidated in a consolidation space, or otherwise have artifacts that are included in a consolidation space. Various triggers or monitoring processes can be put into place such that a consolidation space can be updated when one of the landscape elements it references is updated, or particular artifacts of such landscape elements are updated. For example, if a new version of the landscape element is installed, a consolidation space that includes that landscape element can be updated, such as by adding, removing, or modifying artifacts in the consolidation space.

As to the content of consolidation spaces of this Example 4, in some implementations artifacts in the consolidation space are limited to artifacts present in a landscape element referenced by the consolidation space. In other cases, additional modelling can be allowed in the consolidation space, where at least a portion of artifacts exist in the consolidation space, but not in the underlying landscape elements, can be exposed to external clients/users. Not allowing additional modelling to occur in a consolidation space can be beneficial, as it can result in consolidation spaces that are lightweight and can be easily added, deleted, or modified. No information is lost, for example, if a consolidation space that does not allow for additional modelling is deleted, as all the artifacts in the consolidation space continue to exist in the original landscape elements. In addition, the consolidation space can be easily reconstituted, if desired, based on the original landscape elements. If additional modelling is allowed in the consolidation space, it may not be practical to change the organization of a landscape (such as grouping of landscape elements), at least to the extent it may affect an existing consolidation space.

If modelling is not allowed, modelling based on artifacts in the consolidation space can be made at higher levels of a use stack, such as at an external client that accesses the consolidation space, as illustrated by the modelling artifact 1476 of the external client 1414. Or, additional artifacts can be included in the constituent landscape elements of a consolidation space. Additional details regarding view stacks are provided in U.S. patent application Ser. No. 17/140,007, filed Apr. 5, 2022, and entitled "Propagation of Extensions of Data Artifacts," incorporated by reference herein to the extent not inconsistent with the present disclosure.

Another issue that can arise in the use of consolidation spaces concerns user authorizations to access data associated with an artifact in the consolidation spaces. In some cases, authorization information can be maintained for the consolidation space (including annotations or extension artifacts that specify authorizations for one or more artifacts) and authorizations can be checked at the consolidation space, such as using authorizations information 1480. However, if a lightweight consolidation space is desired, including for reasons discussed above, authorizations need not be maintained at the level of the consolidation space. Rather, user information can be passed to a consolidated landscape element to be evaluated using authorizations information of the landscape element as part of executing UNION logic of a consolidated artifact. For example, FIG. 14 illustrates authorizations information 1482 for the landscape elements 1446, 1448. Optionally, even if the consolidation space does not apply restrictions on accessing data associated with the consolidation space, authorization information 1480 for the consolidation space or authorization information 1484 for an external client 1414 can restrict the ability of users to create, delete, or modify a consolidation space.

Note that the consolidation spaces of this Example 4 can use the grouping techniques of Examples 1-3. That is, landscape elements within a particular group can be analyzed for consolidation, including at different levels of group nesting. However, consolidation spaces can be used in situations where landscape elements are not grouped, or where an existing grouping is a default grouping, such as a set of applications or content available to a particular organization. Or, more granular groupings can be considered, but using a technique other than the technique described in Examples 1-3.

Example 5—Example Organizational Operations with Consolidation Spaces

Consolidation spaces, and in some cases, consolidation elements more generally, can undergo a variety of operations, including adding consolidation spaces, removing consolidation spaces, adding landscape elements to consolidation spaces, or removing landscape elements from consolidation spaces. An advantage of consolidation spaces, in particular, is that their construction is invisible to end users or processes. However, once consolidation spaces have been created and are operational, operations from consuming spaces, including cross-spaces, should be redirected to the consolidation spaces, which may require a pause in operations until the configuration is updated.

In addition, artifacts in consuming spaces may need to be redeployed, which can involve updating/altering views to alter their join conditions to refer to artifacts in consolidation spaces.

Another organizational operation involves grouping operations as discussed earlier. That is, in some cases landscape elements can be removed from a group, which may require new cross-spaces, since the un-grouped spaces are no longer part of a consolidation space to which a consuming cross-space referred. Artifacts in the existing cross-space can be updated to no longer refer to the consolidation space, at least to the extent they involved a landscape element removed from the grouping. If all landscape elements are removed from a grouping, the consolidation space may no longer be required, as the consolidation space may no longer consolidate any landscape elements. As part of removing the consolidation space, references in consuming applications may need to be updated, which can be a reverse of the process used when a consolidation space is created.

Apart from the effect on cross-spaces of removing a landscape element from a consolidation space, removing landscape elements from a consolidation space may involve redefining or redeploying artifacts in the consolidation space, such as to remove artifacts associated with the removed landscape element from a UNION operation in a consolidation artifact of a consolidation space. In some cases, a removed artifact may have had attributes that were not present in other consolidated artifacts, which could have resulted in NULL values (or default or other values) being added to such other consolidated artifacts. If desired, these NULL values/the extra attribute can be removed from artifacts of landscape elements that remain consolidated by the consolidation space.

As will be further described, consolidated landscape elements can have overlapping data—data for the same artifact having the same key. If an artifact for a landscape element being removed from a consolidation space was designated as a preferred data source for a consolidation artifact (such as described in Example 7), that designation may need to be updated to account for the removal of the landscape element.

In general, in some cases, once a last consolidated landscape element is removed from a consolidation space, the consolidation space can be removed. In other cases, the consolidation space can be left instantiated even if no landscape elements are included in the consolidation space, where the instance can be used if groupings or landscape elements change, and the consolidation space can again be used to consolidate landscape elements. Similar actions can be taken when only a single landscape element remains in a consolidation space, as technically nothing is being consolidated using a consolidations space that only refers to a single landscape element.

If a landscape element is added to a consolidation space, artifacts in the contributing landscape elements can be updated accordingly, such as to update UNION operations in the consolidation artifacts of the consolidation space to refer to artifacts of the added landscape element. The artifacts themselves may also need to be updated to include any new attributes from artifacts in the added landscape element. If there are differences in attributes for source artifacts of a consolidation artifact, the source artifacts may need to be updated to also include the new attribute, and NULL (or default or some other specified value) added to the artifacts of the consolidated landscape elements. As explained further in Example 6, a consolidation space can track what landscape elements are included in a consolidation space, such as using a table. This construct can also be updated when a landscape element is added to a consolidation space. Optionally, artifacts in consuming spaces of the consolidation space may also need to be updated, such as so they can be figured as to whether consolidated data should be used, or if the data should be filtered to that of the added consolidated landscape element. In some cases, as explained in Example 7, consuming artifacts can be associated with configuration information that provides that data to be retrieved, will have an identifier of a particular landscape element set by an initial data item retrieved during processing, wherein the identifier determines how additional data processing (such as JOIN operations) will be performed. In this case, removal of a landscape element may not require redeployment of artifacts that refer to the consolidation space, although the artifacts in the consolidation space may be updated.

Example 6—Example Consolidation Element Implementation with Data Separation for Consolidated Landscape Elements Grouping and consolidating data, or at least providing access to data using a consolidation element, such as the consolidation spaces described in Example 4, can be beneficial, as it can allow users or processes to access a larger set of data as compared with accessing single instances of data (such as data associated with a particular instance of an application). Even if a user or process has access to multiple instances of a particular type of data, it may be cumbersome to obtain data from more than one source. A user or process would need to be aware that multiple instances of the data exist, execute operations to obtain the data, and then consider if or how data should be merged from the multiple instances.

Even if the data is obtained and merged, information about the source of particular data may be lost, and a user or process may no longer be able to retrieve or manipulate data from a particular data instance.

Examples above describe how an application instance for the United States and an application instance for the European Union may exist. Grouping techniques can be used to indicate that data from both instances should be considered together, at least for some purposes, and consolidation elements can allow access to the combined data. However, consider the case where consolidation is provided using a UNION operation that simply combines data from multiple data sources. Unless data being combined via the UNION has some attribute that allows for data from one source to selectively be obtained, a query against the UNION operation will retrieve data from the combined data sources, which can lead to wasted computing resources or inaccurate results. Although data may be obtained directly from data sources that contribute to consolidated data, at least in some cases, this still creates additional knowledge and implementation burdens.

The present disclosure can address the issues noted above by introducing an attribute that indicates a landscape element with which data is associated (i.e., a landscape element from which particular data was obtained). The landscape element identifying attribute can be added as an attribute to an artifact that includes a UNION operation. In particular, the attribute can be added to a view definition that contains the UNION operation, such as a being a field (new column) of the view.

Figure 15:
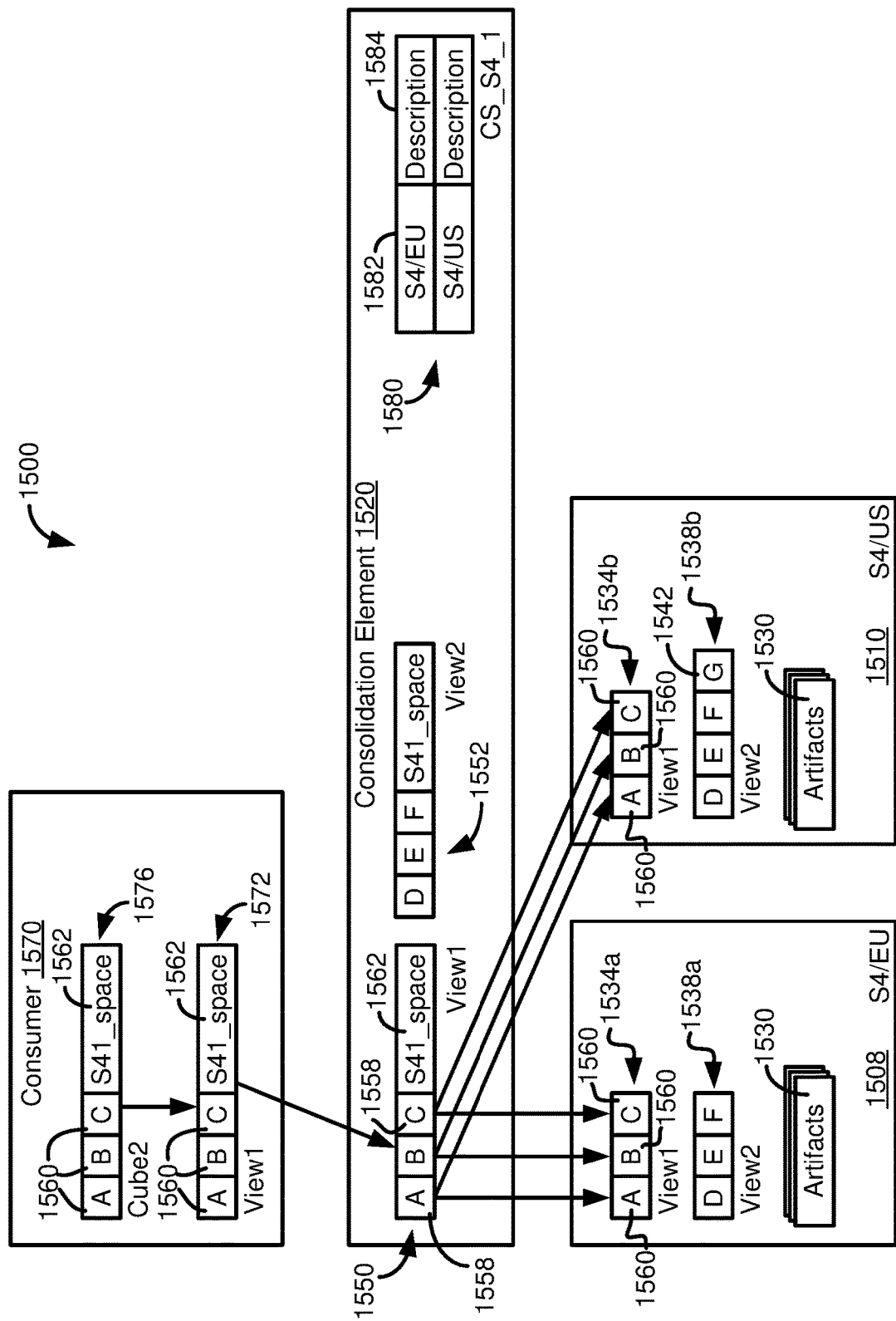
FIGS. 15-17 illustrate landscapes having one or more consolidation spaces that includes features for identifying from which landscape element particular data originates, as well as illustrating artifacts that reference consolidation artifacts in a consolidation space.

FIG. 15 illustrates a computing environment 1500 that includes a landscape element identifying attribute. In this context, at least, a "landscape element" can include features of a landscape that are defined with respect to other landscape elements. That is, some landscape elements may be "base" elements, such as application/content instances that are primary sources of data within a landscape. In at least some cases, a "base" element is a primary source of data for the landscape, but is not an ultimate primary source of the data. For instance, a landscape element may have at least some artifacts, including tables or view, where data is obtained via replication or data federation. A remote data source, outside of the landscape, may serve as the primary source of the replicated/federated data.

Examples of landscape elements that are not "base" elements include those that are defined with reference to one or more base landscape elements. A consolidation element, for example, consolidates two or more base elements, but in turn, other landscape elements, such as additional consolidation elements or cross-spaces, can be defined with reference to a consolidation element. Similarly, cross-spaces may be defined with respect to two or more "base" landscape elements, but additional cross-spaces can be created with reference to another cross-space, or cross-spaces can be combined by a consolidation element.

FIG. 15 illustrates a consolidation element 1520 that is defined with respect to a first landscape element 1508 and a second landscape element 1510. The first and second landscape elements 1508, 1510 contain a plurality of artifacts 1530, such as tables or views. At least a portion of the artifacts of the landscape elements 1508, 1510 represent different instances of a common artifact, such as a first instance of a view and a second instance of a view. The landscape elements 1508, 1510 can have artifacts that do not overlap. In addition, as has been explained, a landscape element can have artifacts that are not included in a consolidation element, regardless of whether there might be another instance of one of those artifacts, including because such artifacts are not exposed outside of the landscape element.

The landscape elements 1508, 1510 are shown as each having an instance of two artifacts, which are part of the artifacts 1530. That is, the landscape elements 1508, 1510 have respective instances 1534a, 1534b of a first artifact, and respective instances 1538a, 1538b of a second artifact. Note that instances of the artifact can be the same, or can differ in some respects. As shown, artifact instances 1534a, 1534b are identical, while artifact instance 1538b has an attribute 1542 that is not included in the instance 1538a. For purposes of illustrating how disclosed technologies can be used, assume that landscape element 1508 includes European Union data for an application, while the landscape element 1510 includes United States data for the application.

The consolidation element 1520 includes artifacts 1550 and 1552 that correspond, respectively, to consolidated artifacts formed from artifacts 1534a, 1534b and 1538a, 1538b. Taking the artifact 1550, it can be seen that it includes attributes 1558 that correspond to the attributes 1560 of the artifact instances 1534a, 1534b. The artifact 1550 can be a view on the artifact instances 1534a, 1534b, such as a view that is defined as a UNION of the artifact instances 1534a, 1534b. As the artifact 1550 combines data from the artifact instances 1534a, 1534b, it includes the attributes 1560 of those artifacts (in the form of the attributes 1558).

The artifact 1550 further includes an attribute 1562 that is used to identify which artifact instance 1534a, 1534b serves as the source for particular data, such as a row. So, take for example a first set of data, such as a row, of the artifact instance 1534a. When data is retrieved using the consolidated artifact 1550, the data will include values for the attributes 1560 in artifact instance 1534a. The data from the instance 1534a will also be associated with a value for the attribute 1562, where the value identifies the landscape element 1508. Now, assume that data for the artifact 1550 includes a second row that originates from the artifact instance 1534b. The consolidated artifact 1550 can be used to obtain values for the attributes 1560 of the second row, and that data will be further associated with a value for the attribute 1562 that identifies landscape element 1510.

A consumer space 1570 references the consolidation element 1520. The consumer space 1570 can be an application used by an end user, or can be another element of a landscape. For instance, a space for cross-application content may reference a consolidation space. Or, a higher-level consolidation space may reference a lower-lever consolidation space represented by the consolidation element 1520.

In referencing the consolidation space 1520, the consumer space 1570 can include one or more artifacts that directly or indirectly reference one or more artifacts of the consolidation space. For example, the consumer space 1570 is shown as having an artifact 1572 that references the artifact 1550 of the consolidation element 1520. While the artifact 1572 has the same attributes 1560, 1562 as the artifact 1550, the artifact 1572 can optionally include attributes that are not in the artifact 1550 or exclude one or more of the attributes 1560.

Artifact 1576 of the consumer space 1570 references the artifact 1572. Although the artifact 1576 is shown as only referencing the artifact 1572, optionally the artifact 1576 can reference other artifacts, including artifacts that correspond to artifacts of the consolidation element 1520 or artifacts that are defined in the consumer space 1570. In addition, the artifact 1576 can optionally include attributes that are not in the artifact 1572 or the artifact 1550, or can omit attributes from the artifacts 1572, 1550.

The artifacts 1572, 1576 are shown as including the landscape element identifying attribute 1562 (which can also be referred to as a contributor identifier attribute). In this way, queries that use the artifacts 1572, 1576 can filter data by landscape element, by including the appropriate value or values for the attribute 1562.

It can be useful to maintain information about what landscape elements are included in a consolidation element. Among other things, this information can be used in consuming spaces/application to help identify (such as to an end user) the scope of a consolidation element, including to identify what filters might be available for retrieving or manipulating data associated with a consolidation element.

Accordingly, the consolidation element 1520 is shown as including a contributors table 1580, which can also be referred to as a landscape element table or a space table. The contributors table 1580 includes a column 1582 that identifies particular landscape elements used in the consolidation element 1520. The column 1582 services as a primary key of the table 1580, and the values for the attribute 1562 serve as foreign keys to the table 1580. Optionally, the table 1580 can include additional attributes, such as a column 1584 that provides a semantic description of the contributing space. The semantic description can be used to provide more meaningful information to a user, such as to assist a user in determining what landscape element identifiers should be selected as filter criteria for a particular use case.

Figure 16:
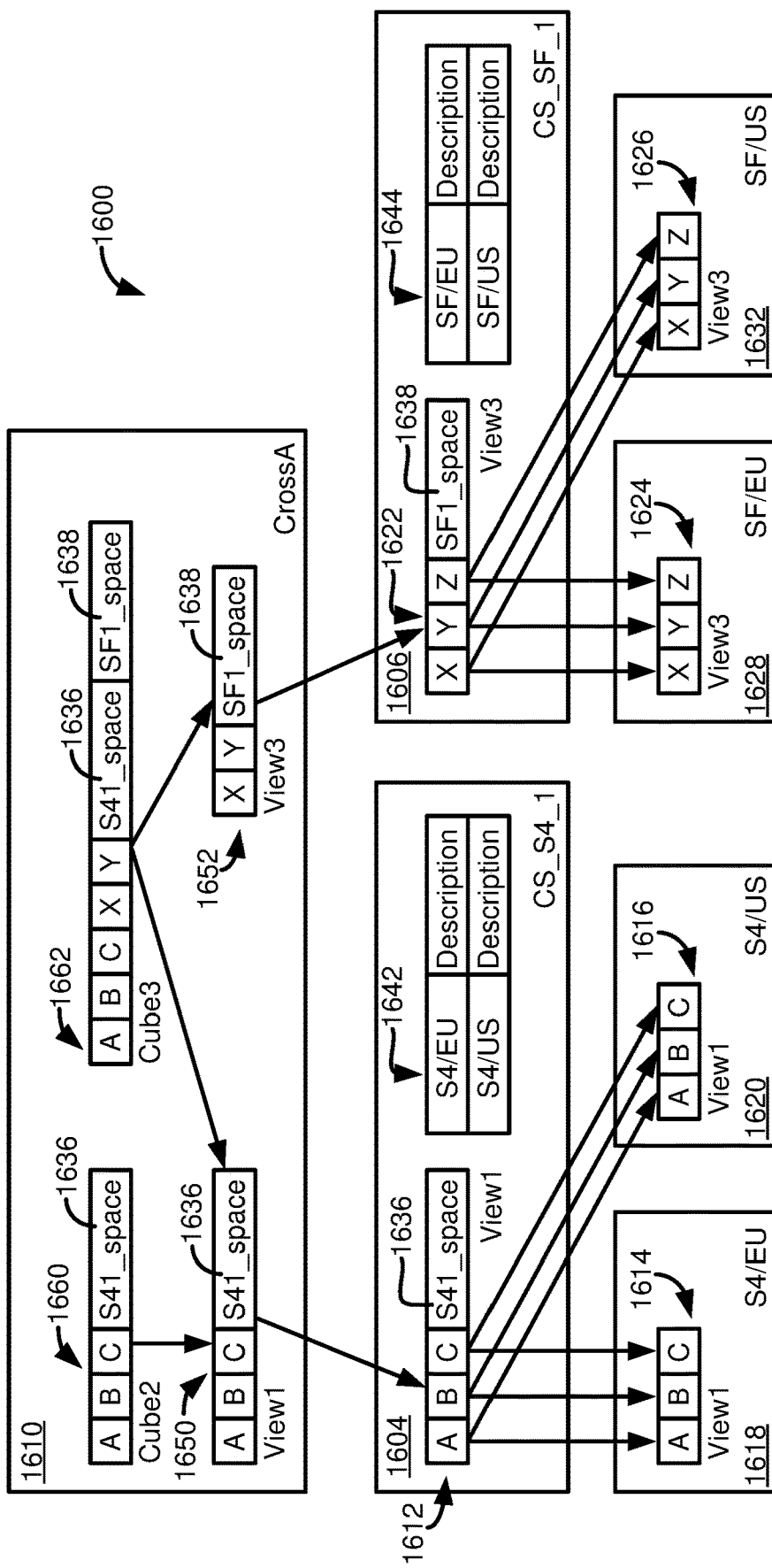

The use of consolidation elements and identifiers to identify source landscape elements for data associated with a consolidation element is further illustrated with reference to FIG. 16. FIG. 16 illustrates a computing environment 1600 that represents a more complex scenario than the computing environment 1500, where the computing environment 1600 includes two consolidation elements 1604, 1606 that are in turn referenced by a landscape element 1610 that is a landscape element for cross application content. That is, the consolidation element 1604 includes a consolidation artifact 1612 that consolidates data (or access to data) for first and second instances 1614, 1616 of an artifact for first and second landscape elements 1618, 1620 (which can represent instances of a first application), while the consolidation element 1606 includes a consolidation artifact 1622 that consolidates data for first and second instances 1624, 1626 of an artifact for third and fourth landscape elements 1628, 1632 (which can represent instances of a second application).

The consolidation artifacts 1612, 1622 are constructed as described for the consolidation element 1520. The consolidation artifacts 1612, 1622 include attributes from the respective artifacts 1614, 1616, 1624, 1626. The consolidation artifacts 1612, 1622 also include respective landscape identifier attributes 1636, 1638 which can be implemented as for the attribute 1562. In addition, each consolidation element 1604, 1606 includes a contributors table, 1642, 1644, respectively, which can be implemented as described for the contributors table 1580.

The landscape element 1610 acts as a consumer of the consolidation elements 1606, 1608. The landscape element 1610 includes an artifact 1650 that references the consolidated artifact 1612 and an artifact 1652 that references the consolidation artifact 1622. Note that while the artifact 1650 includes all of the attributes of the consolidation artifact 1612, including the landscape identifier attribute 1636, the artifact 1652 does not include all of the attributes of the consolidation artifact 1622. This can represent, for example, the artifact 1652 being defined as a projection of the artifact 1622.

The landscape element 1610 includes an artifact 1660 that is defined with reference to the artifact 1650, and an artifact 1662 that is defined with respect to both artifacts 1650 and 1652. Since the artifact 1662 is defined with respect to artifacts that are associated with different consolidation elements, the artifact 1662 includes the contributor identification attributes 1636, 1638 for each of the constituent consolidation elements 1604, 1606. If desired, filter criteria can be provided for one or both of the attributes 1636, 1638 when data requests are processed using the artifact 1662. Thus, while consolidated data is available from the consolidation elements 1604, 1406, the landscape element 1610 can also retrieve data associated with specific landscape elements that are consolidated using a consolidation element.

In a consumer space, such as the consumer space 1570 or the landscape element 1610, multiple artifacts can reference artifacts in a consolidation space. For example, the artifact 1662, rather than referencing the artifacts 1650, 1652 in the landscape element 1610, can directly reference the consolidation artifacts 1612, 1622. However, it can be beneficial to, when possible, have an artifact in the consuming space reference another artifact in the consuming space that references an artifact in a consolidation element, rather than directly referencing the artifact in the consolidation space. A reason for this is that a first object (which can be a lowest level artifact in a stack of artifacts) that references an artifact in a consolidation element, which can be referred to as a proxy artifact, can set filtering and projection operations that can be leveraged by artifacts that reference the proxy artifact, including limiting data transferred from a consolidation element to a consumer space. Referencing the proxy artifact can simplify the handling of artifact dependencies.

The proxy artifact can also simplify configuration issues. As will be discussed in further examples, it can be useful to configure artifacts to specify how data from multiple sources should be integrated, including whether data is merged, is maintained as separate, or if a single data source should be used when data is available from multiple data sources (for example, data with the same key exists in artifacts in different consolidated landscape elements). Using the proxy artifact, these configuration options can be set once and used by multiple higher-level artifacts, which can, for example conduct additional filtering and projection operations if not all of the data of the proxy artifact is needed.

In some cases, consolidation artifacts can be created in a consolidation landscape element before artifacts are created in a consuming space that reference either consolidation artifacts or "base" artifacts in a landscape element consolidated by a consolidation element. In such cases, artifacts in the consuming space can be created as including one or more columns for landscape identifier attributes. However, in other cases, the artifacts in a consuming space may exist before creation of a consolidation element. Or, it may be desirable to update an artifact that includes a landscape identifier attribute, regardless of how/when the artifact was created.

In some implementations, when a consolidation artifact in a consolidation element is created or updated, a consuming space is also updated, such as to create an artifact that references the consolidation artifact or to update an artifact that references the consolidation artifact. A consuming artifact can have a definition that is updated to include an appropriate landscape identifier attribute (such as for a particular consolidation element), to remove a landscape identifier attribute (such as if a consolidation element is removed from a landscape), or the modify a landscape identifier attribute (which can be implemented as a deletion of a prior attribute and an addition of a new attribute). In other cases, the landscape identifier attributes are included as extensions to an artifact definition. Including the landscape identifier attribute as an extension can be beneficial, as it can help avoid interference with changes to the underlying (extended) artifact, including when the extended artifact is an artifact in a cross-content landscape element. In cross-content landscape elements, for example, the content of an artifact may be managed separately from landscape-organizational aspects of the artifact.

Landscape identifier attributes can be propagated among artifacts in a consuming landscape element. For example, a second artifact may be created that references a first artifact that has a landscape identifier attribute, and the landscape identifier attribute can be added (propagated to) the second artifact. This scenario is illustrated in FIG. 16, where consuming artifact 1650 has its landscape identifier attribute 1636 propagated to artifacts 1660, 1662, and consuming artifact 1652 has its landscape identifier attribute 1638 propagated to propagated to artifact 1662. Propagation technologies that can be included in disclosed technologies include those described in U.S. patent application Ser. No. 17/714,007, filed Apr. 5, 2022, which is incorporated by reference herein to the extent not inconsistent with the present disclosure.

Figure 17:
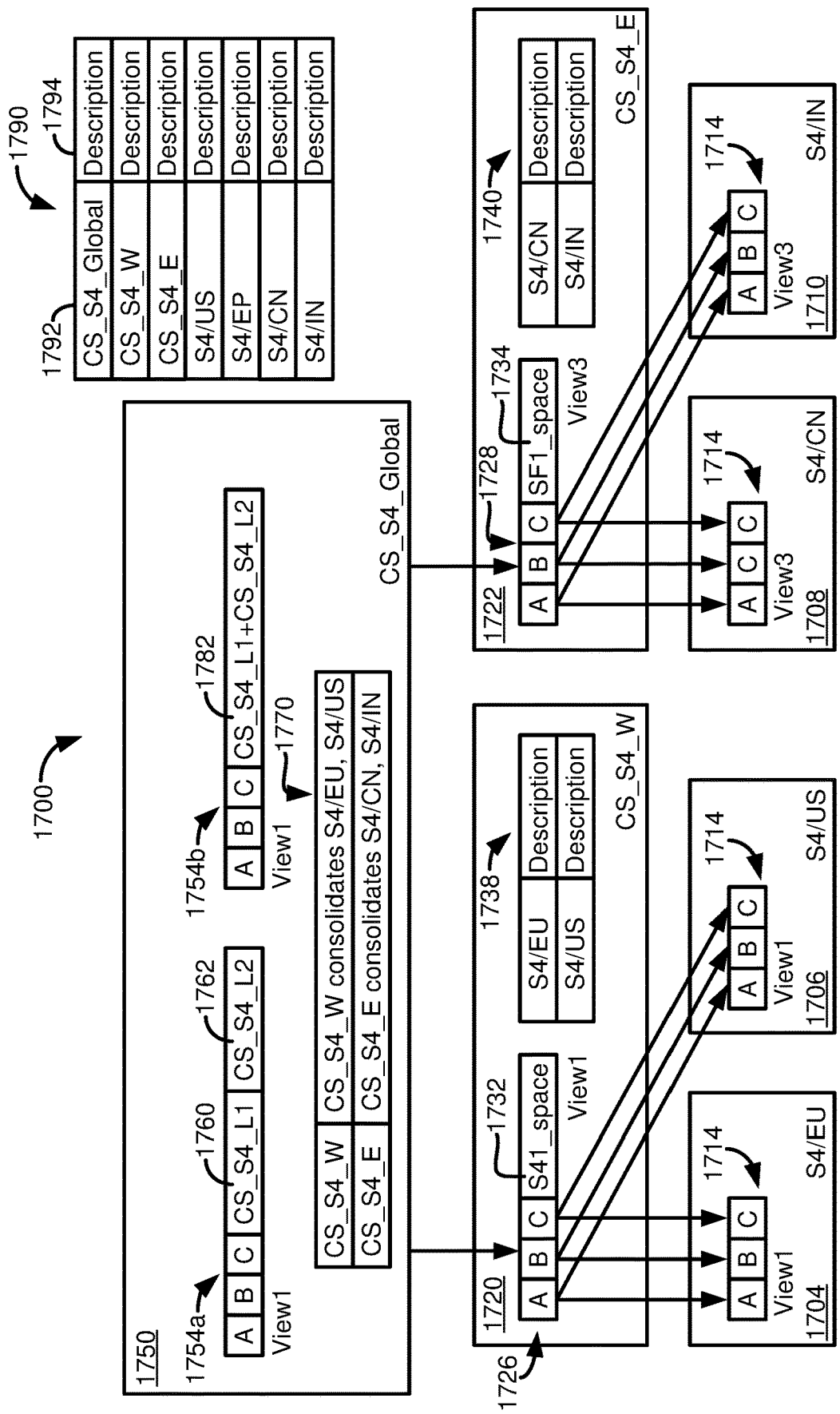

Complications can arise when consolidation elements are arranged hierarchically—where one consolidation element itself consolidates another consolidation element, as illustrated in FIG. 17. FIG. 17 illustrates a computing environment 1700 that is similar in some ways to the computing environment 1600 of FIG. 16, in that both include two consolidation elements. However, while the computing environment 1600 had consolidation elements for different software applications, the computing environment 1700 includes separate consolidation elements for the same application, and these consolidation elements are themselves consolidated using a higher-level consolidation element, as will be further described.

FIG. 17 includes base landscape elements 1704, 1706, 1708, 1710, which for the purposes of this example can represent application instances for four separate geographic regions: the United States, the European Union, China, and India. Each of the base landscape elements 1704, 1706, 1708, 1710 includes an instance 1714 of a first data artifact, such as a table or view. Separate consolidation elements 1720, 1722 are defined, respectively, for a "west" grouping, including the base landscape elements 1704, 1706 (for the US and the EU) and for an "east" grouping, including the base landscape elements 1708, 1710 (for China and India).

The consolidation elements 1720, 1722 include respective consolidation artifacts 1726, 1728 that consolidate the respective instances 1714 of the first data artifact. As was explained in conjunction with FIG. 16, the consolidation artifacts 1726, 1728 include contributor identifier attributes 1732, 1734 to indicate a base landscape element 1704, 1706, 1708, 1710 from which a given set of data (such as a row of a table or view) originates. The consolidation elements 1720, 1722 also include respective contributors tables 1738, 1740, which provide additional information about the respective base landscape elements 1704, 1706 and 1708, 1710 that are consolidated by a respective consolidation element 1720, 1722.

A consolidation element 1750 consolidates the consolidation elements 1720, 1722. For a consolidation artifact 1754 (shown as versions 1754a, 1754b), various options are presented for providing contributor information that allows for filtering at multiple levels of landscape elements. Including a single value contributor identifier in a single contributor attribute can be problematic as it can limit filtering options to a single level of a consolidation hierarchy. For example, if only one contributor identifier value can be provided, contributor information may be limited to identifying one of the consolidation elements 1720, 1722 or one of the base landscape elements 1704, 1706, 1708, 1710. Thus, the ability to filter data by landscape element may be limited.

If it is desirable to preserve multiple options for filtering at multiple levels of landscape elements, different approaches can be taken, both of which are illustrated in the consolidation element 1750. In practice, typically only a single approach will be implemented. In the consolidation artifact 1754a, two landscape identifier attributes 1760, 1762 are provided. One of the attributes 1760, 1762 can be used to identify the consolidation element 1720 or the consolidation element 1722, and the other attribute can be used to identify the base landscape element 1704, 1706, 1708, or 1710. One issue with this approach is that it may not be clear, or at least as clear, how landscape elements at multiple levels are related. That is, from attributes 1760, 1762 themselves, it may not be clear or determinable that consolidation element 1720 consolidates base landscape elements 1704, 1706 or some other combination of the base landscape elements 1704, 1706, 1708, 1710. Another issue is that since two or more contributor identifier attributes may be present in a given consolidation artifact, it may be unclear as to how contributor identifier attributes should be determined, such as how many contributor identifier attributes are present in a consolidation artifact or what the names of such attributes might be.

In some cases, one or both of the issues can be ameliorated using a contributors table, such as shown for the contributors table 1770. An identifier column 1772 describes the spaces directly consolidated using the consolidation element 1750. A description column 1774 of the contributors table can provide parent-child information for possible values of the contributor identifier attributes 1760 (indicating a highest level of a hierarchy), 1762 (indicating a next lowest level of a hierarchy). For example, if a filter value is "CS_S4_W," the description column 1772 can have information indicating the landscape elements 1704, 1706 are children of "CS_SW." Similarly, if a filter value is an identifier of the landscape element 1704 or the landscape element 1708, the consolidation element 1720 can be identified as a parent of such landscape element.

Consolidation artifact 1754b illustrates an alternative approach, having a single contributor identifier attribute 1782. In some aspects, values of the identifier attribute 1782 can be produced by concatenating values of different contributing landscape elements, such as "S4/L1+S4L1," where L1 and L2 indicate, respectively, the level of the consolidation elements 1720, 1722 and the level of the base landscape elements 1704, 1706, 1708, 1710.

An advantage of such an approach is that a static attribute name can be used, and a structure of a consolidation artifact need not change based on the architecture of a particular landscape. A downside of this approach is that processing filter values can be more resource intensive since string operations may be used to separate a concatenated value into its constituent filter values.

In some cases, it can be beneficial to have a summary of all landscape elements in a landscape/computing environment, as illustrated by the table 1790. In some cases, the table 1790 can be analogous to the contributors table 1780 (or the contributors tables 1642, 1644 of FIG. 16), including providing an identifier 1792 of a landscape element and a description 1794 of the landscape element. In this case, the contributors tables 1738, 1740 can optionally be omitted, or can include only the identifiers of the consolidated landscape elements, where other information, such as a description, can be obtained from the table 1790, such as through a JOIN operation.

FIG. 18 illustrates code 1800 for an example consolidation data artifact that can be included in a consolidation element. Code section 1810 defines columns present in at least one of the artifacts from a landscape element being consolidated, and line 1812 adds a contributor identifier attribute that has a name 1814 that is unique to a particular consolidation element.

Line 1820 specifies a UNION operation (in this case, specifically, a UNIONALL operation) that includes selection operations 1830 and 1840. The selection operations 1830, 1840 include respective statements 1832, 1842 that populate the contributor identifier column declared at 1812 with values indicating the particular landscape element from which data retrieved via the UNION operation was retrieved.

Example 7—Example Data Integration Techniques

Example 6 described techniques for maintaining data separation for consolidated landscape elements. This Example 7 describes how data from individual landscape elements can be consolidated. These innovations of Example 7 can be used with other techniques of the present disclosure, including those related to grouping, consolidation spaces, and data separation. However, the innovations of Example 7 can be used in other scenarios where data from multiple sources is to be integrated.

As discussed, different landscape elements can represent instances of a common source, such as instances of a software application, where a software application can have particular artifacts, such as tables or views. Thus, consolidation of data for the different landscape elements can involve consolidation of data from different instances of particular data artifacts that are associated with a particular type of landscape element, such as a particular software application.

The discussion continues using the example of data consolidation for an artifact, such as a database view, but it should be appreciated that the described techniques can be used with other types of artifacts, software objects, etc. Different instances of a view can have both structural differences and difference in data associated with the view. For example, as described in Example 6, some instances of a view may have attributes that are not present in other versions of the view. As for data, a variety of situations can exist. The data associated with two (or more) instances of a data artifact can be completely disjunctive, such as having data with different primary keys, can have harmonized data (data with the same primary keys, where data in two different instances of the view with the same key refers to the same "thing," such as an entity), unharmonized data (where at least some primary keys overlap between the two view instances, but where at least some of these keys refer to different "things," or a combination thereof).

When it comes to merging data for multiple versions of the view, a variety of possibilities exist. In the case of disjunctive data, it can typically be assumed data can be simply "combined" in a consolidation artifact, as data from one instance will not overwrite/conflict with data from another instance. In the case of harmonized data, however, importing data from both source artifacts would typically result in data from one artifact replacing data from the other having the same key. A similar situation exists in the case of disjunctive data, but in this case overwriting data or failing to include certain data because of duplicate keys can result in data for one item (such as an entity) being "lost"/not consolidated because another item had the same key, even though the first item is "different" than an item referred to in the other instance of the key.

The different possible relationships between data can create issues, including because it may be difficult to determine how (or whether) particular data should be combined. For example, it may not be possible to determine how type of data combination should be applied to two instances of an arbitrary view. Putting that aside, implementing particular types of data combinations on an artifact-by-artifact basis can be time consuming and error prone.

In some cases, rules can be defined that indicate, for example, that one particular landscape element should service as a "primary" source of data for all overlapping data/artifacts. That is, in the case of duplicate keys, data from the "primary" source would be selected. However, such a designation may be too coarse, in that it could be that in practice one landscape element should serve as primary source for one particular view, but another landscape element should serve as a primary source for a different particular view. In other situations, it may be possible to define rules based on a type of content associated with data, where the type may be associated with a view, such as in an annotation, that it can automatically determine how data should be combined. However, such rules may not be appropriate for all situations, and suitable indicators of content type may not be available.

The present disclosure helps address the problems noted above by associating constructs that refer to consolidation artifacts with configuration information indicating how data for the artifact from different underlying source artifact instances should be combined, or which of multiple source artifact instances should be used. In a particular example, the configuration information can be provided in the form of an annotation to a consuming artifact. Including configuration information in consumers of consolidation artifacts can be beneficial as compared with including configuration information in a source artifact instance in a particular landscape element, as particular landscape element (or creator/administrator thereof) may not be "aware" of what other landscape elements may exist, which is particularly true when at least some content in a landscape element is provided by a source different than a consumer of the consolidated information. That is, while artifacts in a landscape element may be created by a particular software company, that company may not be aware of all possible landscapes in which that landscape element may appear, such as described in earlier Examples of the present disclosure. Even if the company had some awareness of different use scenarios, it may not be possible to configure the artifact to account for all use possibilities, including possibilities the company may not have envisioned.

In some cases, appropriate configuration information can be maintained in a consolidation element, which can be useful as the consolidation element is defined with respect to particular landscape elements. To provide more granularity, configuration information for data integration can be maintained in particular consolidation artifacts.

However, maintaining configuration information in consolidation elements can be undesirable in some cases, such as if it is desired to have consolidation elements that are lightweight or can be automatically created, such as in the consolidation spaces discussed in previous Examples. Further, when a consolidation element (or particular consolidation artifacts thereof) are deleted, the configuration information would be lost as well.

Accordingly, in particular implementations, data integration configuration information is included in components that consume consolidation artifacts of a consolidation element, such as artifacts in a consolidation space. Consuming artifacts, for example, are typically created by users who better understand the data sources used by the consuming artifacts, and thus how the data should be integrated. Once the configuration information is provided, a computer-implemented framework can handle data integration according to the configuration information.

One drawback to the above approach is that configuration information may need to be repeatedly defined, either for the same consumer or as between different consumers. That is, each artifact in a consuming space that separately references a consolidation space may need to include data integration configuration information, since the configuration is not made at the level of the consolidation element. In the case of redundant configuration information for the same consumer, the issue can be ameliorated by having a "poxy" artifact that refers to the consolidation element and includes integration configuration information. Other artifacts can refer to/be defined with respect to the proxy artifact, and thus need not include redundant configuration information.

The configuration information can be provided in the forms of tags or categories that are applied to components of a consumer of a consolidation element, such as including tags in artifacts of a consuming space. The categories can include enumerated values of, "undefined," "disjunctive," "harmonized keys," "representative provider," and "harmonized data," where the meaning of each tag will be further explained. The "undefined" tag can refer to a situation where no assumptions about data integration are made, and can be a default tag that is applied until/unless updated, including by the application of particular automated rules. If the "undefined" tag is used, an identifier of a particular landscape element need not be provided unless specific filtering is desired. In this case, disregarding any filtering by landscape element, an artifact having the "undefined" tag will retrieve data associated with all artifact instances defined in a consolidation artifact. However, associations that combine data from multiple artifacts (such as in a view that refers to multiple other views/entities), including formal JOIN, operations, have an additional association condition on a contributor identifier attribute. In other words, each execution of the association conditions will retrieve data associated with a specific landscape element, that is associated with an anchor record (or other anchor data).

The "disjunctive" tag can be used when it is known that different source artifacts use different keys (for example, where the employees of an application instance for the United States differ from those in the European Union, and such employees are associated with different primary key values). If the "disjunctive" tag is used, an identifier of a particular landscape element need not be provided unless specific filtering is desired. In this case, disregarding any filtering by landscape element, an artifact having the "disjunctive" tag will retrieve data associated with all artifact instances defined in a consolidation artifact. However, as with "undefined" artifacts, associations for "disjunctive" artifact instances that combine data from multiple artifacts (such as in a view that refers to multiple other views/entities), including formal JOIN, operations, have an additional association condition on a contributor identifier attribute. In other words, each execution of the association conditions will retrieve data associated with a specific landscape element, that are associated with an anchor record (or other anchor data).

The "harmonized keys" tag can be used when it is known that at least some keys are duplicated in different source artifacts, but where a key exists in multiple source artifacts, it refers to the same "thing." However, some source artifacts can have keys that are not in other source artifacts, or different source artifacts can have elements with the same key, but where some attributes differ. In this case, data from multiple source artifacts can be retrieved using a JOIN operation, wherein an identifier of the contributing space is added to the JOIN condition. Thus, as with the "undefined" and "disjunctive" tags, for artifact instances with "harmonized keys," JOIN results for a given anchor record will be limited to those within the same landscape element, which can avoid situations where data does not exist in a corresponding artifact instance in a different landscape element, or where keys in a particular artifacts instances are harmonized, but data in non-key attributes is disjunctive.

"Representative provider" serves as a special case of the situation where "harmonized keys" exist. In this situation, a particular source data artifact is selected as the data source to be used with the consuming artifact, such as because the particular artifact has a greater amount of data/high data quality. The identification of a representative provider can be manually provided in the definition of a consuming artifact. This identifier will serve as a filter condition (e.g., "WHERE CONTRIBUTOR_IDENTIFIER=REPRESENTATIVE_PROVIDER_ID").

"Harmonized data" is another special case of "harmonized keys." "Harmonized data" indicates that data can be selected from any source, presumably without loss of information or quality. "Harmonized data" can be implemented using a static identifier of a particular source artifact, or a particular identifier can be determined dynamically, such as on a per-query basis. The source artifact identifier to be used can be randomly selected or selected using particular criteria, such as based on which source artifact instance has a largest amount of data or highest data quality, or which source artifact would provide the best performance (for example, providing the fastest query response or the fewest computing resources). Otherwise, "harmonized data" can be implemented in a similar manner as explained for the "representative provider" scenario, where a filter condition is applied to a view definition.

An issue that can arise when configuration information is placed in a consumer space is whether the configuration remains valid as the landscape changes. For example, if a landscape element is removed from a consolidation space, that may affect the validity of configuration information in consuming artifacts that use a consolidation element. In some cases, when changes are made to a consolidation element, such as adding landscape elements to, or removing them from, a consolidation element can trigger an alert to a user, so the user can determine whether any configuration information should be updated.

FIG. 19 illustrates code 1900 for an example, generalized annotation definition for a data artifact, such as for CSN views as implemented in products available from SAP SE of Walldorf, Germany. The code 1900 includes an element 1910 identifying a contributor identification attribute. Element 1920 identifies a particular data integration type to be used with the annotated artifact, where the value of element 1920 can be one of the tags indicated above. In the case of a "representative provider," a particular value of the contributor identification attribute can be provided for element 1920.

FIG. 20 illustrates example code 2000 for an example artifact definition that includes an annotation 2010 that is a specific implementation of the code 1900. In this case, the annotation 2010 indicates that source data artifact instances referenced by the artifact defined by the code 1900 are disjunctive, and so, for example, data associations for the artifact defined by the code 1900 will be modified to include an association to a contributor identification attribute.

FIG. 21 illustrates example code 2100 for another example artifact definition that includes an annotation 2110 that is a specific implementation of the code 1900. In this case, the annotation 2110 indicates that the "representative provider" regime should be used, where line 2120 provides an identifier of the representative provider—a particular landscape element.

Example 8—Example Implementations

Figure 22:
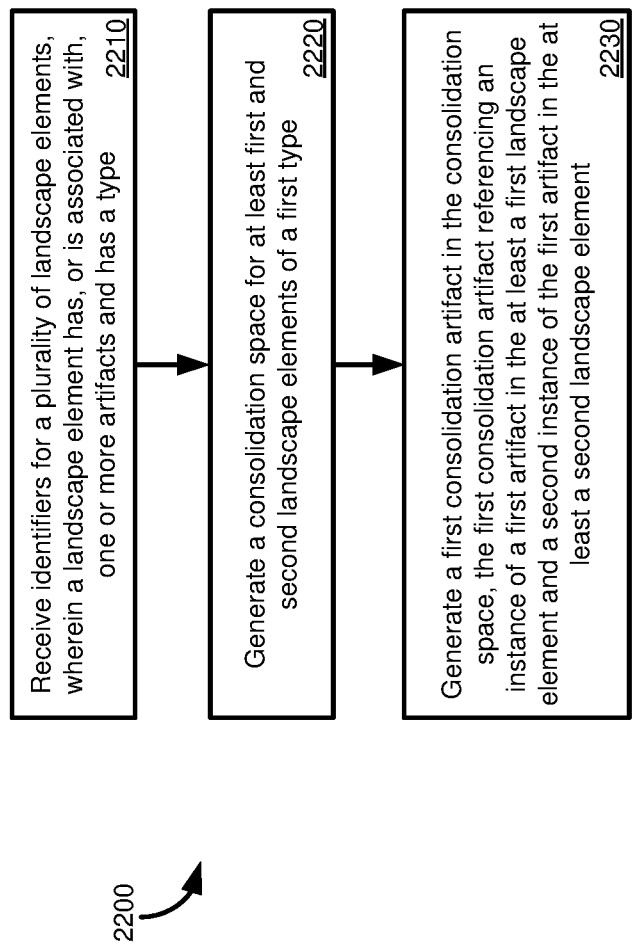
FIG. 22 is a flowchart illustrating a technique for defining a consolidation space.

The present disclosure provides techniques for creating consolidation spaces, where the consolidation spaces are used to provide consolidated access to data associated with multiple instances of a software application or software content. One such technique is summarized in the flowchart 2200 of FIG. 22.

At 2210, identifiers are received for a plurality of landscape elements, such as instances of a software application or software content. A given landscape element of the plurality of landscape elements include one or more artifacts, such as tables or views, and has a type (for example, the type can identify a particular application or a particular set of software content). A consolidation space is generated at 2220 for at least a first landscape element of the plurality of landscape elements having a first type and at least a second landscape element of the plurality of landscape elements having the first type. At 2230, a first consolidation artifact is generated in the consolidation space. The first consolidation artifact references a first instance of a first artifact in the at least a first landscape element and a second instance of the first artifact in the at least a second landscape element.

Example 9—Computing Systems

Figure 23:
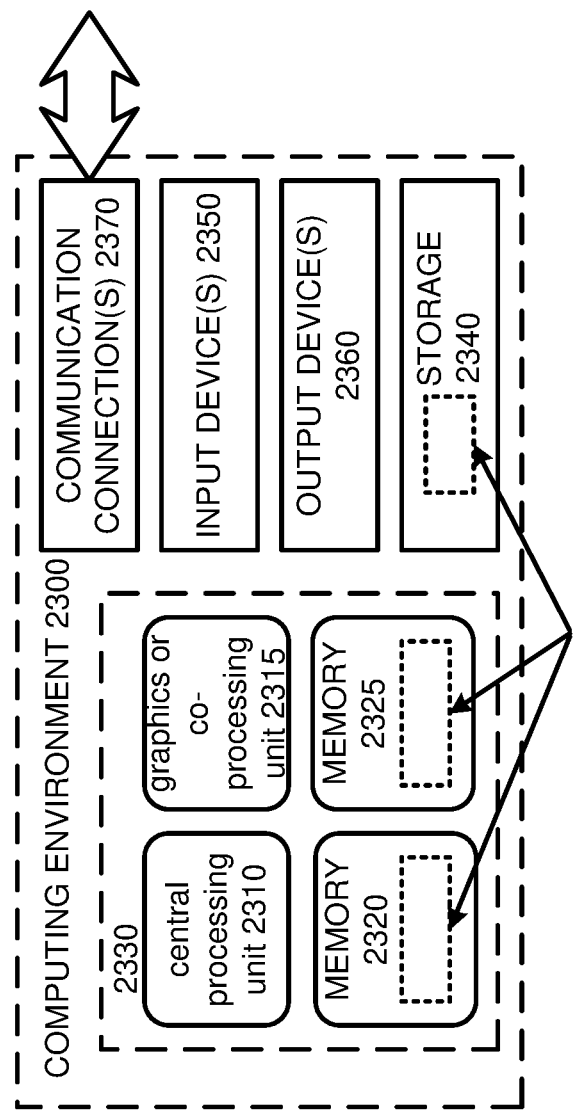
FIG. 23 is a diagram of an example computing system in which some described embodiments can be implemented.

FIG. 23 depicts a generalized example of a suitable computing system 2300 in which the described innovations may be implemented. The computing system 2300 is not intended to suggest any limitation as to scope of use or functionality of the present disclosure, as the innovations may be implemented in diverse general-purpose or special-purpose computing systems.

With reference to FIG. 23, the computing system 2300 includes one or more processing units 2310, 2315 and memory 2320, 2325. In FIG. 23, this basic configuration 2330 is included within a dashed line. The processing units 2310, 2315 execute computer-executable instructions, such as for implementing techniques describes in Example 1-8. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 23 shows a central processing unit 2310 as well as a graphics processing unit or co-processing unit 2315. The tangible memory 2320, 2325 may be volatile memory (e.g., registers, cache, RAM), non-volatile memory (e.g., ROM, EEPROM, flash memory, etc.), or some combination of the two, accessible by the processing unit(s) 2310, 2315. The memory 2320, 2325 stores software 2380 implementing one or more innovations described herein, in the form of computer-executable instructions suitable for execution by the processing unit(s) 2310, 2315.

A computing system 2300 may have additional features. For example, the computing system 2300 includes storage 2340, one or more input devices 2350, one or more output devices 2360, and one or more communication connections 2370. An interconnection mechanism (not shown) such as a bus, controller, or network interconnects the components of the computing system 2300. Typically, operating system software (not shown) provides an operating environment for other software executing in the computing system 2300, and coordinates activities of the components of the computing system 2300.

The tangible storage 2340 may be removable or non-removable, and includes magnetic disks, magnetic tapes or cassettes, CD-ROMs, DVDs, or any other medium which can be used to store information in a non-transitory way, and which can be accessed within the computing system 2300. The storage 2340 stores instructions for the software 2380 implementing one or more innovations described herein.

The input device(s) 2350 may be a touch input device such as a keyboard, mouse, pen, or trackball, a voice input device, a scanning device, or another device that provides input to the computing system 2300. The output device(s) 2360 may be a display, printer, speaker, CD-writer, or another device that provides output from the computing system 2300.

The communication connection(s) 2370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 24:
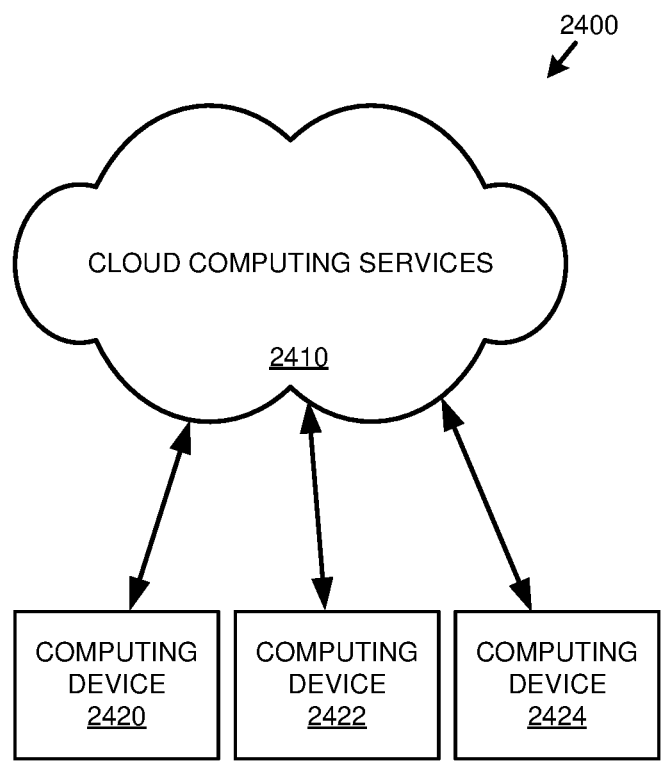
FIG. 24 is an example cloud computing environment that can be used in conjunction with the technologies described herein.

FIG. 24 depicts an example cloud computing environment 2400 in which the described technologies can be implemented. The cloud computing environment 2400 comprises cloud computing services 2410. The cloud computing services 2410 can comprise various types of cloud computing resources, such as computer servers, data storage repositories, networking resources, etc. The cloud computing services 2410 can be centrally located (e.g., provided by a data center of a business or organization) or distributed (e.g., provided by various computing resources located at different locations, such as different data centers and/or located in different cities or countries).

The cloud computing services 2410 are utilized by various types of computing devices (e.g., client computing devices), such as computing devices 2420, 2422, and 2424. For example, the computing devices (e.g., 2420, 2422, and 2424) can be computers (e.g., desktop or laptop computers), mobile devices (e.g., tablet computers or smart phones), or other types of computing devices. For example, the computing devices (e.g., 2420, 2422, and 2424) can utilize the cloud computing services 2410 to perform computing operators (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 23, computer-readable storage media include memory 2320 and 2325, and storage 2340. The term computer-readable storage media does not include signals and carrier waves. In addition, the term computer-readable storage media does not include communication connections (e.g., 2370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one hardware processor;
at least one memory coupled to the at least one hardware processor; and
one or more computer readable storage media storing computer-executable instructions that, when executed, cause the computing system to perform operations comprising:
receiving identifiers for a plurality of landscape elements, wherein a given landscape element of the plurality of landscape elements comprises, or is associated with, one or more artifacts and has a type;
generating a consolidation space for at least a first landscape element of the plurality of landscape elements having a first type and at least a second landscape element of the plurality of landscape elements having the first type; and
generating a first consolidation artifact in the consolidation space, the first consolidation artifact referencing a first instance of a first artifact in the at least a first landscape element and a second instance of the first artifact in the at least a second landscape element.

2. The computing system of claim 1, the operations further comprising:
associating the consolidation space with an identifier identifying the consolidation space as a consolidation space.

3. The computing system of claim 1, wherein the first consolidation artifact defines a UNION operation on the first instance of the first artifact and the second instance of the first artifact.

4. The computing system of claim 1, wherein the first consolidation artifact comprises a schema that is separate from a schema of the at least a first landscape element and a schema of the at least a second landscape element.

5. The computing system of claim 1, the operations further comprising:
determining that a first set of attributes for the first instance of the first artifact comprises a first attribute that is not included in a second set of attributes for the second instance of the first artifact;
wherein the generating the first consolidation artifact comprises generating the first consolidation artifact with the first set of attributes.

6. The computing system of claim 5, wherein the generating the first consolidation artifact with the first set of attributes is carried out based at least in part on determining that the first instance of the first artifact is a more recent version of the first artifact than the second instance of the first artifact.

7. The computing system of claim 5, wherein the first attribute is specified in an extension to the first instance of the first artifact.

8. The computing system of claim 5, the operations further comprising:
associating the second instance of the first artifact will NULL values for the first attribute.

9. The computing system of claim 5, the operations further comprising:
associating the second instance of the first artifact with a default value or a default value calculation for the first attribute.

10. The computing system of claim 5, the operations further comprising:
associating the second instance of the first artifact with values of the first instance of the first artifact for the first attribute.

11. The computing system of claim 1, the operations further comprising:
determining that the first instance of the first artifact is exposed externally to the at least a first landscape element;
wherein the generating the first consolidation artifact is based at least on part on the determining that the first instance of the first artifact is exposed externally to the at least a first landscape element.

12. The computing system of claim 1, wherein the first instance of the first artifact comprises an annotation indicating that the first instance of the first artifact is exposed externally to the at least a first landscape element.

13. The computing system of claim 1, the operations further comprising:
determining that a second artifact of the at least a first landscape element is not exposed externally to the at least a first landscape element; and
based at least in part on the determining that the second artifact is not exposed externally to the at least a first landscape element, not creating a consolidation artifact for the second artifact in the consolidation space.

14. The computing system of claim 1, wherein the consolidation space consists of artifacts corresponding to artifacts in landscape elements consolidated by the consolidation space.

15. The computing system of claim 1, the operations further comprising:
determining that the at least a first landscape element has been updated;
determining that the first instance of the first artifact has been modified; and
updating the first consolidation artifact to incorporate a modification to the first instance of the first artifact.

16. The computing system of claim 1, the operations further comprising:
determining that the at least a first landscape element has been updated;
determining that a second artifact has been added to the at least a first landscape element; and
creating in the consolidation space a second consolidation artifact that references the second artifact.

17. The computing system of claim 1, the operations further comprising:
determining that a first set of attributes for the first instance of the first artifact comprises a first attribute that is not included in a second set of attributes for the second instance of the first artifact;
determining that the first instance of the first artifact is older than the second instance of the first artifact; and
based at least in part on the determining that the second instance of the first artifact is older than the second instance of the first artifact, defining the first consolidation artifact to comprise the first set of attributes, wherein the first consolidation artifact does not include the first attribute.

18. The computing system of claim 1, the operations further comprising:
determining that the first instance of the first artifact comprises a first attribute having a first identifier and a first datatype;
determining that the second instance of the first artifact comprises a second attribute having the first identifier and a second datatype, the second datatype being different than the first datatype; and including the first and second attributes in the first consolidation artifact.

19. A method, implemented in a computing system comprising at least one hardware processor and at least one memory coupled to the at least one hardware processor, the method comprising:

receiving identifiers for a plurality of landscape elements, wherein a given landscape element of the plurality of landscape elements comprises, or is associated with, one or more artifacts and has a type;

generating a consolidation space for at least a first landscape element of the plurality of landscape elements having a first type and at least a second landscape element of the plurality of landscape elements having the first type; and generating a first consolidation artifact in the consolidation space, the first consolidation artifact referencing a first instance of a first artifact in the at least a first landscape element and a second instance of the first artifact in the at least a second landscape element.

20. One or more non-transitory computer-readable storage media comprising:

computer-executable instructions that, when executed by a computing system comprising at least one hardware processor and at least one memory coupled to the at least one hardware processor, cause the computing system to receive identifiers for a plurality of landscape elements, wherein a given landscape element of the plurality of landscape elements comprises, or is associated with, one or more artifacts and has a type;

computer-executable instructions that, when executed by the computing system, cause the computing system to generate a consolidation space for at least a first landscape element of the plurality of landscape elements having a first type and at least a second landscape element of the plurality of landscape elements having the first type; and computer-executable instructions that, when executed by the computing system, cause the computing system to generate a first consolidation data artifact in the consolidation space, the first consolidation data artifact referencing a first instance of a first data artifact in the at least a first landscape element and a second instance of the first data artifact in the at least a second landscape element.

* * * * *